(12) United States Patent
Paul et al.

(10) Patent No.: US 6,793,831 B1
(45) Date of Patent: Sep. 21, 2004

(54) MICROLAMINATION METHOD FOR MAKING DEVICES

(75) Inventors: Brian Kevin Paul, Corvallis, OR (US); Richard Budd Peterson, Corvallis, OR (US); Tyson Jedd Terhaar, Tualatin, OR (US)

(73) Assignee: State of Oregon acting by and through the State Board of Higher Education on behalf of Oregon State University, Corvallis, OR (US)

( * ) Notice: Subject to any disclaimer, the term of this patent is extended or adjusted under 35 U.S.C. 154(b) by 0 days.

(21) Appl. No.: 09/369,679

(22) Filed: Aug. 5, 1999

Related U.S. Application Data

(60) Provisional application No. 60/095,605, filed on Aug. 6, 1998.

(51) Int. Cl.[7] .............................. C25F 7/00; B23H 9/00
(52) U.S. Cl. ......................... 216/36; 216/52; 156/155; 156/221; 156/253; 156/274.4; 156/380.2; 156/510; 29/17.1; 29/89.5; 148/194; 148/516; 148/559; 148/714; 228/159; 228/163
(58) Field of Search ..................... 216/36, 52; 29/17.1, 29/89.5; 228/159, 163; 148/194, 516, 559, 714; 156/155, 221, 253, 274.4, 380.2, 380.8, 510

(56) References Cited

U.S. PATENT DOCUMENTS

| | | | |
|---|---|---|---|
| 4,875,619 A | 10/1989 | Anderson et al. | ........... 228/190 |
| 5,087,930 A | 2/1992 | Roy et al. | ................... 346/140 |

(List continued on next page.)

OTHER PUBLICATIONS

Goldberg, (Mar. 1984) Narrow Channel Forced Air Heat Sink, IEEE Transactions on Components, Hybrids, and Manufacturing Technology, vol. CHMT–7 No. 1, pp. 154–159.

Haas, et al. (1993) Fabrication and Performance of MMW and SMMW Platelet Horn Arrays, *Intl. J. Infrared and Millimeter Waves*, 14(11):2289–93.

Martin, P.M., et al. (1995) Microchannel heat exchangers for advanced climate control, Proc. SPIE, 2639: 82–8.

Wegeng, R.S., et al. (Dec. 1995) Energy systems miniaturization technologies, devices, and systems, *Proceedings of the International Symposium on Advanced Energy Conversion Systems and Related Technologies* (RAN95).

Wegeng, R.S., C.J. Call, and M.K. Drost (Feb. 1996) Chemical system miniaturization, *Proceedings of the AIChE Spring National Meeting*.

(List continued on next page.)

*Primary Examiner*—Allan Olsen
(74) *Attorney, Agent, or Firm*—Klarquist Sparkman, LLP

(57) ABSTRACT

A method for fabricating devices in a pre-assembled state comprising forming plural laminae, registering the laminae, and bonding the laminae one to another is described. The plural laminae contain the substructures and structures of the device. The substructures are coupled to structures and other substructures by fixture bridges in the pre-assembled state. The substructures of the device are dissociated by eliminating the fixture bridges. The plural laminae are registered and bonded to form the device either before or after the fixture bridges are eliminated. The fixture bridges can be eliminated in a variety of ways, including vaporization by electrical current, chemical dissolution, or thermochemical dissociation. One method to selectively bond the laminae together is by microprojection welding. Microprojection welding comprises forming laminae with projections that extend from at least one planar surface of the lamina. Bonding together of laminae at selected regions is accomplished by placing the laminae between electrodes and passing a current through the electrodes. The laminae are bonded together selectively at the sites of the projections. Another method for bonding lamina involve diffusion soldering at reduced bonding pressures and temperatures to minimize flow restriction within or to features.

60 Claims, 10 Drawing Sheets

U.S. PATENT DOCUMENTS

| | | | | |
|---|---|---|---|---|
| 5,345,892 A | * | 9/1994 | Khan | 219/119 |
| 5,469,264 A | * | 11/1995 | Shigemori | 60/520 |
| 5,610,645 A | | 3/1997 | Moore et al. | 347/93 |
| 5,611,214 A | | 3/1997 | Wegeng et al. | 62/498 |
| 5,689,966 A | | 11/1997 | Zess et al. | 62/238.6 |
| 5,811,062 A | | 9/1998 | Wegeng et al. | 422/129 |
| 6,202,312 B1 | * | 3/2001 | Rando | 257/414 |

OTHER PUBLICATIONS

Hershberg, G., (1988) Manufacturing Technology of the Tektronix Digital Ink Jet Head, *SPSE 3rd International Congress on Advanced in Non–Impact Printing Technologies, Journal of Imaging Technology*, 14:124–128 (1998).

Knight, R., (1992) Optimal Thermal Design of Air Cooled Forced Convection Finned Heat Sinks–Experimental Verification, *IEEE Transactions of Components . . .*, 15:754–760.

Esposito, A. (1988) Fluid Power with applications, pp. 380–381, *Prentice Hall*.

Humpston, G. and Jacobson, DM, (1993) Principles of Soldering and Brazing, 4.4.2. Diffuion Soldering and Brazing, ASM International pages 128–143.

Technology Development Through Industrial Partnerships, (Oct. 1997) *Federal Energy Technology Center*.

Matson, Dean W., Laser micromachined microchannel solvent separator, *SPIE* vol. 3223, pp. 253–259.

Martin, P.M., et al. (1997) Microfabrication methods for michrochannel reactors and separations systems, *Pacific Northwest National Laboratory*.

Krause, V., et al. (1994) Microchannel coolers for high power laser diodes in copper technology, Proc. SPIE vol. 2148:351–358.

Kleiner, M.B., (Dec. 1995) High Performance Food Air Cooling Scheme Employing Microchannel Heat Exchangers, *IEEE Transactions on Components, Packaging, and Manufacturing Technology*, vol. 18, No. 4.

Jacobson, DM and Humpston, G., (Feb. 1992) Diffusion Soldering, *Soldering and Surface Mount Technology*, 10:27–32.

NASA, (1988) National Space Transportation System Shuttle Reference Manual, p. 8, located at www.ksc.nasa.gov/shuttle/technology/sts–newsref/sts–oms.html.

Ridley, N. et al., (Sep. 1992) Isostatic diffusion bonding of microduplex stainless steel, *Mat. Sci. and Tech.*, 8:791–795.

Khan, T. and Wallach, E.R., (Jun. 1996) Transient liquid phase diffusion bonding and associated recrystalization phenomenon when joining ODS ferritic superalloys, J. of Mat. Sci., 31:2937–43.

Lopez, B. et al., (Jan. 1996) Microstructural analysis of steel–nickel alloy clad interfaces, *Mat. Sci. and Tech.*, 12:45–55.

Cuta, J.M., et al., (1995) Fabrication and testing of microchannel heat exchangers, SPIE Conf., 2640:152–60.

Haas, R.W., (1995) Further development of MMW and SMMW platelet feed horn arrays, Astron. Soc. Pac. Conf. Ser., 75:99–105.

* cited by examiner

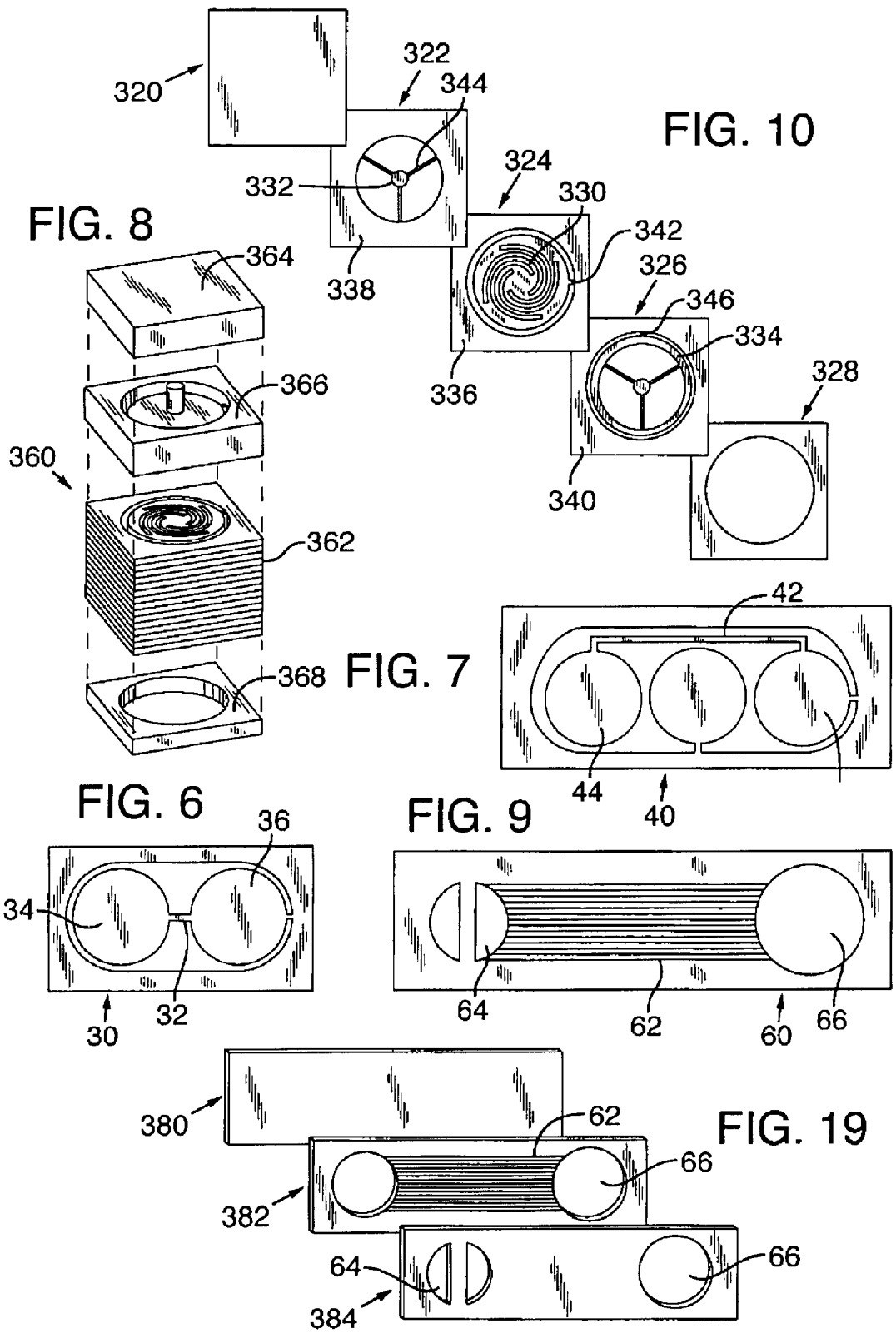

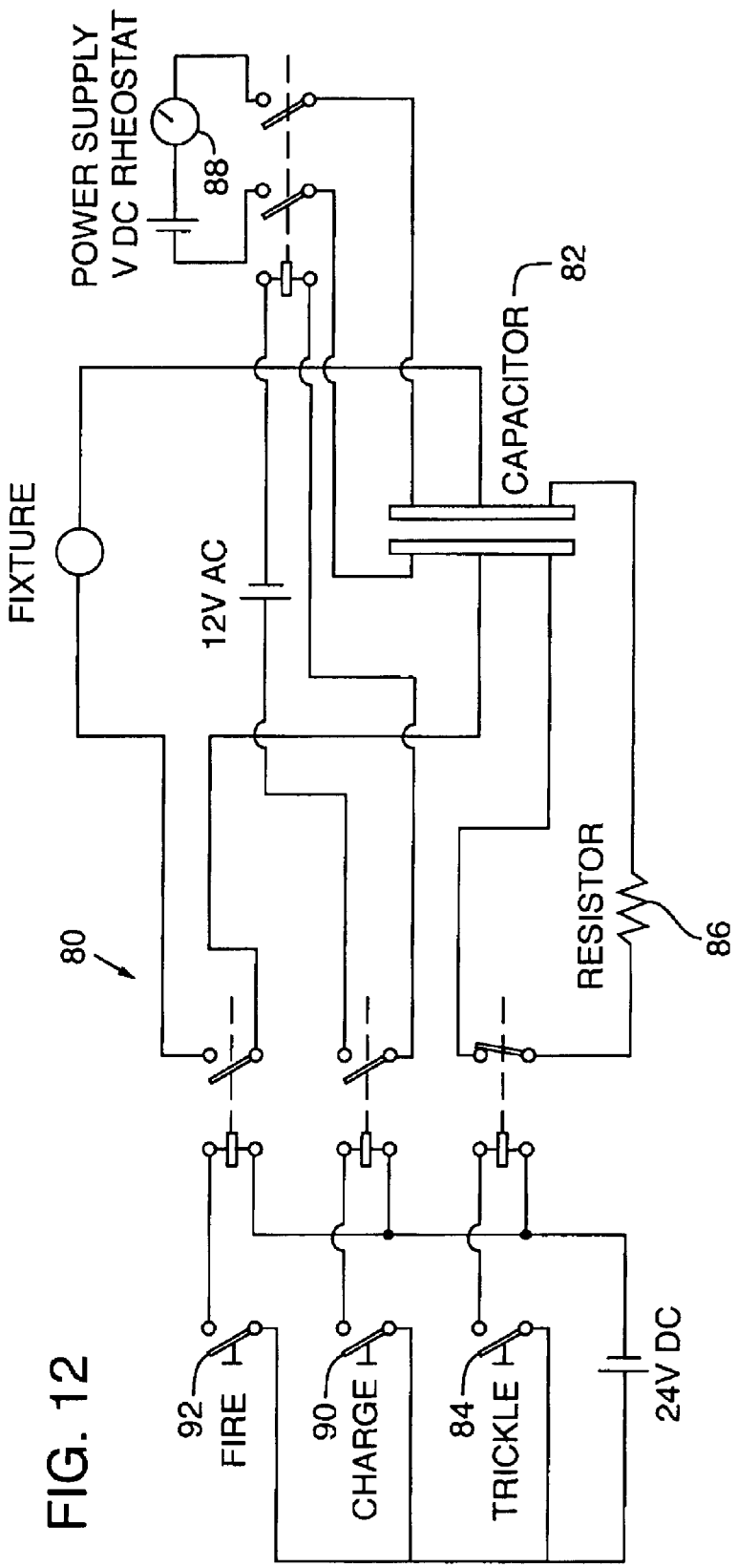

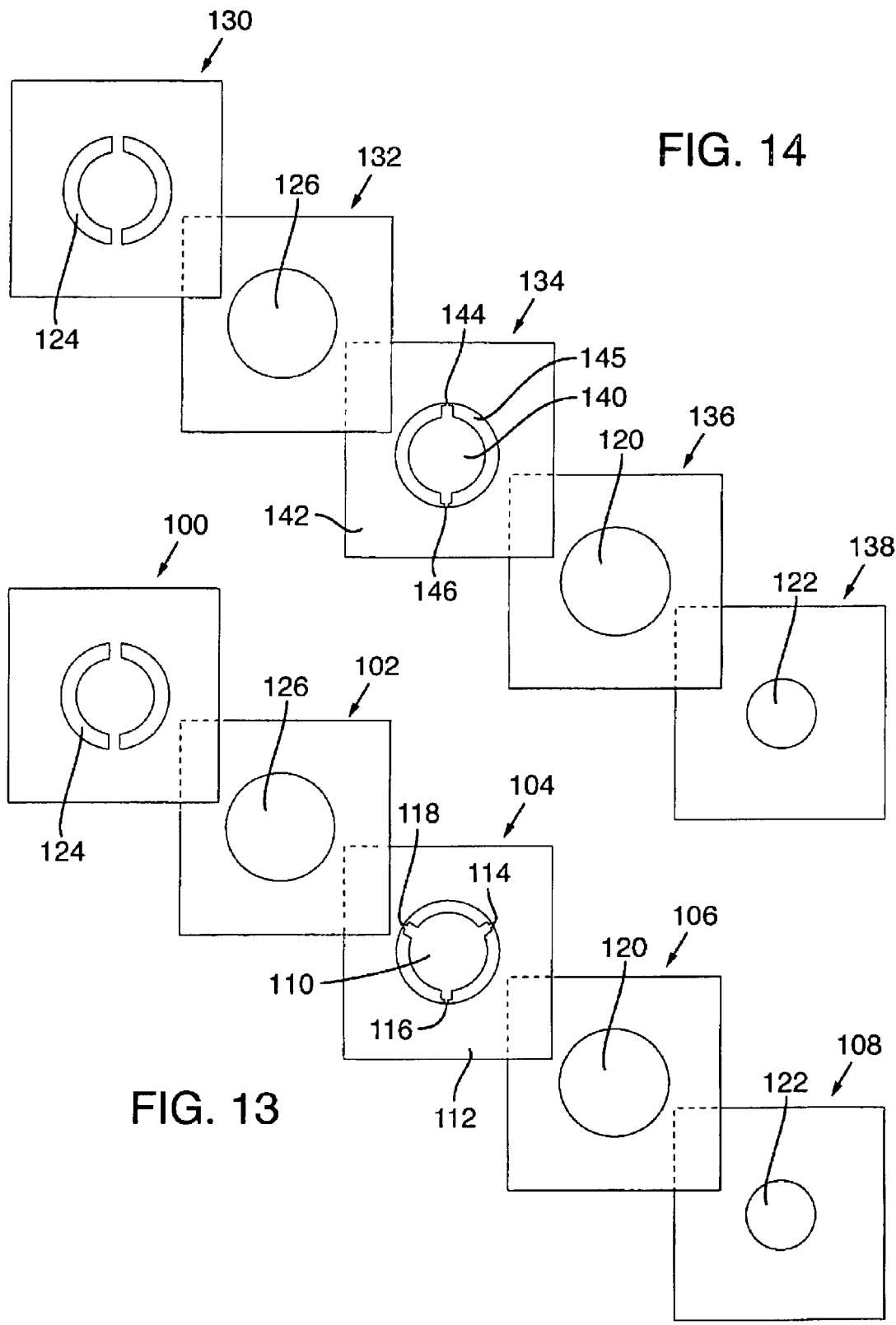

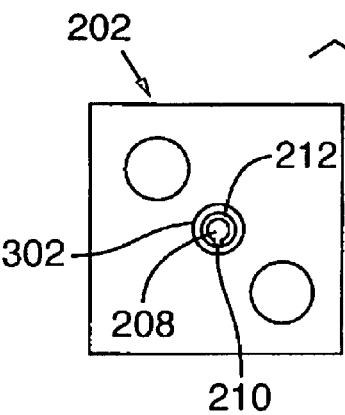
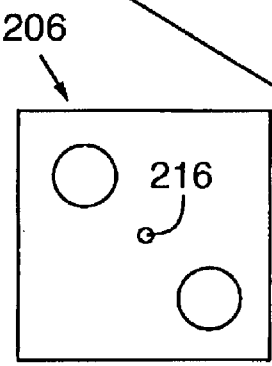
FIG. 16
FIG. 18
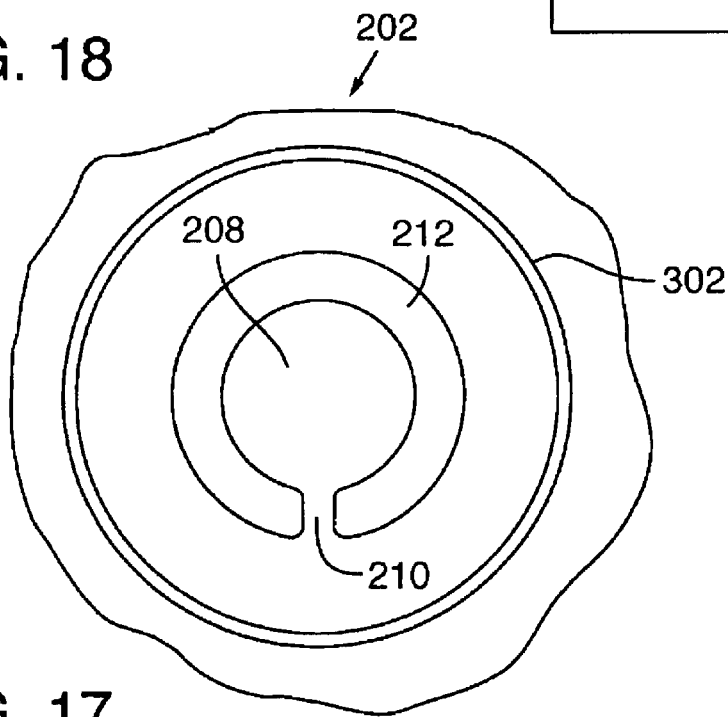
FIG. 17
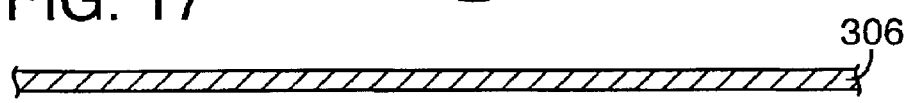
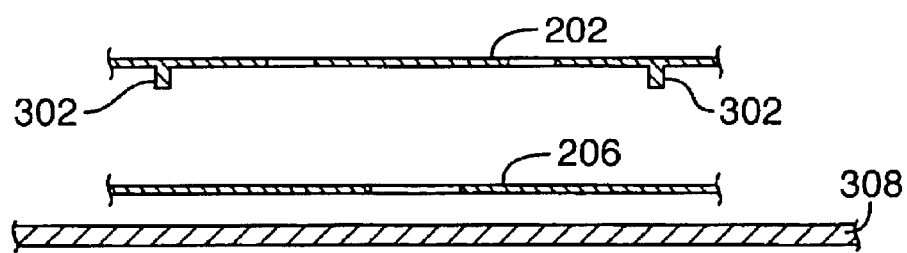

MICROLAMINATION METHOD FOR MAKING DEVICES

CROSS REFERENCE TO RELATED APPLICATION

This application is a continuation of applicants' prior pending provisional application No. 60/095,605, filed Aug. 6, 1998, which is incorporated herein by reference.

FIELD

The present invention concerns a method for making devices, particularly microelectromechanical systems, and devices made by the method.

BACKGROUND

Microtechnology-based energy and chemical systems (MECS) are devices that rely on embedded microstructures for their function. The overall size of MECS devices places them in the mesoscopic regime, i.e. in a size range between macro objects, such as automobile engines and laboratory vacuum pumps, and the intricate MEMS based sensors that reside on a silicon chip. Mesoscopic systems are expected to provide a number of important functions where a premium is placed on mobility, compactness, and/or point application. The internal processes of these devices rely on length scales that are much smaller than traditional systems. For thermal and chemical applications, a small characteristic size provides the benefits of high rates of heat and mass transfer, large surface-to-volume ratios, and the opportunity for operating at elevated pressures.

For other more mechanically operated meso machines, such as generators and motors, small dimensions imply rapid response and compact design. Furthermore, these systems often can be volume produced, which results in a substantial reduction in the cost of producing each device. MECS also will find increasingly important uses where small-scale heat engines, heat pumps and refrigerators are needed. For example, the development of miniature refrigerators could provide point cooling of high speed electronics and communication equipment for enhancing performance (Little, 1990). Also, power packs based on combustion rather than electrochemistry could extend operating times of electronic devices by a factor of ten (Benson and Ponton, 1993). MECS also can be used for chemical processing. For example, miniaturized chemical reactors could provide on-site neutralization of toxic chemicals, thereby eliminating the need for transport and burial (Koeneman, et al., 1997).

Many MECS devices rely on fluidic processes. As a result, the same technology can be applied to biological applications. Miniaturized bioreactors could provide precisely regulated environments for small groups of cells to enhance their production of therapeutic drugs, or the detection of toxic compounds. Such bio-applications could range from benchtop research to large-scale production facilities.

A specific example of a microtechnology-based energy and chemical system is a heat pump for cryogenic cooling of high-speed electronics. One embodiment of such a heat pump is a resonantly coupled alpha-Stirling cooler, which is only 2 centimeters long. The heat pump comprises a thermal compressor, which further includes a displacer, an electromagnetic coil, and a heating element. The displacer comprises a series of linear flexural springs and spacers laminated together. The displacer is fixed in the center. When a magnetic field is applied, the outside of the displacer oscillates, thereby producing a Stirling cycle cooling effect. The alpha-Stirling cooler includes a heat exchanger/regenerator, having multiple microchannels. The performance of this system depends on several microfeatures, including the microchannels, which are about 50 $\mu$m wide, and the gap between the displacer and the cylinder, which is about 20 $\mu$m.

The manufacturing technology currently available for producing microelectronics or MEMS will not be sufficient for producing MECS because of the mechanical and thermal requirements of these systems. For example, it is desirable to make the displacer springs in the alpha-Stirling heat pump from a highly fatigue resistant, ferromagnetic material. This is not possible with current MEMS fabrication technology.

It also is desirable to fabricate high-aspect-ratio microstructures, for instance a microstructure having a height-to-width ratio of at least 20:1. Currently, the MEMS fabrication technologies that are capable of producing these high-aspect-ratio microstructures are not suitable for economical, high-volume production. Some, such as LIGA, are quite expensive. Lower-cost MEMS fabrication technologies are being developed, but they generally rely on lithographic techniques to form micromolds for electroplating metals. The drawbacks to these lithographic techniques include limited material selection, limited geometric complexity, and inconsistent pattern-transferring methods. The non-lithographic fabrication technologies that currently are available are either serial in nature or involve single-layer thin-film formation. Serial techniques are unlikely to allow economical mass production. Single-layer, film-forming techniques provide limited geometrical complexity.

Thus, current MEMS fabrication technology cannot produce the geometries necessary for MECS in a low-cost, high-volume manner. Thus, there is a need for economical microassembly methods to allow low-cost, high-volume production of MECS sufficient to compete with conventional macroscale energy and chemical systems. For example, it is desirable to have components in these miniature systems that are freely movable within the system. There also is a need for new and improved methods for bonding together laminae to form monolithic MECS.

SUMMARY

The present invention addresses the needs identified in the Background, such as the need for economical microassembly methods to allow low-cost, high-volume production of MECS sufficient to compete with conventional macroscale energy and chemical systems. Moreover, the method of the present invention can make miniature systems having components that are freely movable within the system, and also provides a new and improved method for bonding together laminae to form monolithic MECS.

The present invention comprises a method for making devices in a pre-assembled state. The method comprises providing plural laminae, at least some of which include structures and substructures that define components of devices, registering the laminae, bonding the laminae, and dissociating the components to make the device. Component dissociation can be performed prior to, subsequent to, or simultaneously with bonding the laminae. One aspect of the invention involves providing plural laminae where at least one lamina comprises at least one structure, at least one substructure, and at least one fixture bridge. Fixture bridges are used to couple the structures and the substructures across the spaces between these structures and substructures in the pre-assembled state. The device is fully assembled once the laminae are bonded together and the substructures are dissociated from the structures. The substructures are dissociated by eliminating the fixture bridges, either prior to or subsequent to registering and bonding the laminae. In another aspect of this invention, fixture bridges can be used to couple two substructures, two non-adjacent substructures, or can be used within a substructure.

Various methods can be used to eliminate the fixture bridges. One method comprises applying an electrical current across the fixture bridge of sufficient power to eliminate the fixture bridge. Another method for dissociating the substructures comprises heating the fixture bridge, and selectively dissolving the heated fixture bridge with a chemical. The fixture bridge is heated to a temperature sufficient to allow the chemical to selectively dissolve the fixture bridge. A third method involves ablating the fixture bridge with a laser. UV lasers are preferable because such lasers minimize heat affects and open up the technique to non-metal materials, such as ceramics and polymers.

Another embodiment of this invention comprises making an array of devices, such that at least one of the plural laminae has an array of at least two assemblies. The assemblies comprise at least one structure, at least one substructure, and at least one fixture bridge. The devices are assembled by eliminating the fixture bridges either prior to or subsequent to registering and bonding the plural laminae. The array of devices can be used in parallel, or the individual devices can be dissociated from each other.

In another aspect of this invention, the laminae are selectively bonded to each other at specific sites on the laminae by microprojection welding or diffusion bonding. Microprojection welding comprises forming lamina with projections that extend from at least one planar surface thereof. The projections can be made of the lamina material or another material suitable for welding or brazing. Selective bonding is accomplished by first placing the laminae between electrodes, such that the laminae contact one another at the site of the projections, and then passing a current through the electrodes. Thus, the laminae are bonded together selectively at the sites of the projections.

In another aspect of the invention, the laminae can be bonded using a diffusion soldering method. Diffusion soldering first comprises preparing and plating the surface of each lamina to be bonded. A typical plating process involves placing a relatively thin first layer (approximately 0.5 $\mu$m) on a bare surface of a lamina that will receive the layer. This first layer promotes adhesion of other platable metals. Then, a second, generally thicker layer, such as a layer preferably from about 2 to about 5 $\mu$m thick, is plated over the first layer as a base upon which to plate a third layer having a thickness preferably from about 2 to about 5 $\mu$m. Working embodiments used a laminate stack having alternating surfaces plated with either silver or tin. The two outside laminae were plated with silver so that the final, bonded stack did not adhere to the alignment jig. Copper may be preferred as a bonding agent because of its ability to readily bond to both nickel and either silver or tin, materials found useful for diffusion soldering of laminae. The temperature of the laminate stack being diffusion bonded/soldered is then momentarily raised above the melting point of the law-temperature melting metal, generally tin (232° C.), under a compression pressure sufficient to achieve the bond. Working embodiments have used compression pressures of approximately 2 MPa to about 5 MPa. Diffusion soldering provides a quick and efficient method for forming a bonded laminate stack having strong bonds that are resistant to moderately high temperatures without restricting flow in or through internal features.

BRIEF DESCRIPTION OF THE DRAWINGS

FIG. 6 is a schematic plan view of a lamina comprising two substructures connected to one another by a fixture bridge.

FIG. 7 is a schematic plan view of a lamina comprising two non-adjacent substructures connected to each other by a fixture bridge.

FIG. 8 is a schematic perspective view of a displacer assembly of an alpha-Stirling cooler.

FIG. 9 is a schematic plan view of a microchannel regenerator of an alpha-Stirling cooler.

FIG. 10 is a schematic plan view of plural laminas used to make a displacer and a cylinder for an alpha-Stirling cooler.

FIG. 12 is a diagram of the circuit used to deliver current for capacitive discharge dissociation.

FIG. 13 is a schematic plan view of the plural laminae that comprise a working embodiment of a one-way float valve.

FIG. 14 is a schematic plan view of plural laminae that comprise a working embodiment of a one-way float valve.

FIG. 16 is a schematic plan view of plural laminae that comprise one embodiment of a flapper valve assembly.

FIG. 17 is a diagrammatic side view of the plural laminae that comprise the flapper valve assembly aligned between the plate electrodes for micro-projection welding.

FIG. 18 is a plan detail view of lamina 202 of the flapper valve assembly of FIG. 16.

FIG. 19 is a schematic perspective view of plural laminas that comprise a portion of an alpha-Stirling cooler.

DETAILED DESCRIPTION OF THE PREFERRED EMBODIMENTS

Figure 1:
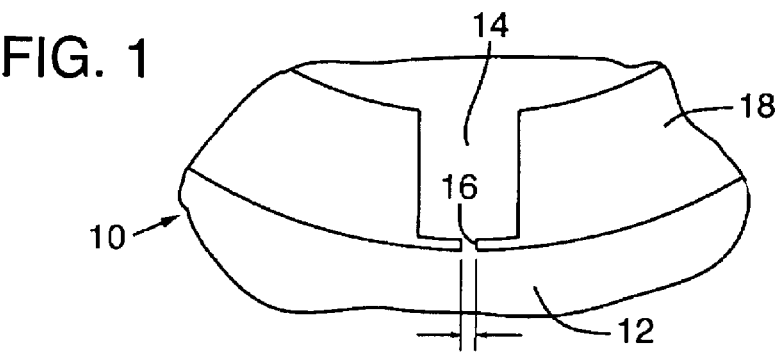
FIG. 1 is a schematic plan view of a structure and a substructure connected by one embodiment of a fixture bridge.

Economical microassembly methods are necessary to enable low-cost, high-volume production of MECS in order to compete with conventional macroscale energy and chemical systems. The microlamination method of the present invention, and the embodiments concerning component dissociation and laminae bonding, allow devices, particularly MECS, to be fabricated and assembled in tandem. The devices can be fabricated in a pre-assembled state, and the components dissociated so that when fabrication is completed, assembly is completed as well.

I. General Discussion

The method of the present invention for making devices comprises providing plural laminae, registering the laminae, and bonding the laminae. The method also includes dissociating components (i.e., substructures from structures) to make the device. Component dissociation can be performed prior to, subsequent to, or simultaneously with bonding the laminae.

In one aspect of the invention, laminae are formed from a variety of materials, particularly metal shims. Any metal or metal alloy can be used for the microlamination method of the present invention, and hence the proper selection of a metal or metal alloy for a particular application will be determined by other factors, such as the physical properties of the metal or metal alloy and cost. Examples of metals and alloys particularly useful for metal microlamination include stainless steel, carbon steel, phosphor bronze, copper, graphite, and aluminum.

Non-metals, such as ceramics, can be used for microlamination as well. For instance, ceramic tape is used in place of metal strips. Other materials, including polymers, composites and intermetallics also can be used.

Laminae useful for the microlamination method of the present invention can have a variety of thicknesses. Generally, the laminae have thicknesses of from about 1 mils to about 32 mils thick, preferably from about 2 mils to about 10 mils thick, and even more preferably from about 3 to about 4 mils thick (1 mil is 1 one-thousandth of an inch). Individual lamina within a stack also can have different thicknesses.

A. Forming Laminae

1. Lamina Patterns

Lamina forming comprises machining or etching a pattern in the lamina. The pattern formed depends on the device being made. Without limitation, techniques including laser-beam, electron-beam, ion-beam, electrochemical, electrodischarge, chemical and mechanical material deposition or removal can be used. The lamina can be formed by both lithographic and non-lithographic processes. Lithographic processes include micromolding and electroplating methods, such as LIGA, and other net-shape fabrication techniques. Some additional examples of lithographic techniques include chemical micromachining (i.e., wet etching), photochemical machining, through-mask electrochemical micromachining (EMM), plasma etching, as well as deposition techniques, such as chemical vaporization deposition, sputtering, evaporation, and electroplating. Non-lithographic techniques include electrodischarge machining (EDM), mechanical micromachining and laser micromachining (i.e., laser photoablation). Photochemical and electrochemical micromachining likely are preferred for mass-producing devices.

A currently preferred method for forming lamina patterns for prototyping devices is laser micromachining, such as laser numerically controlled micromachining. Laser micromachining has been accomplished with pulsed or continuous laser action in working embodiments. Machining systems based on Nd:YAG and excimer lasers are typically pulsed, while $CO_2$ laser systems are continuous. Working embodiments of the present invention using Nd:YAG systems typically were done with an Electro Scientific Industries model 4420. This micromachining system used two degrees of freedom by moving the focused laser flux across a part in a digitally controlled X-Y motion. The laser was pulsed in the range of from about 1 kHz to about 3 kHz. This provides a continuous cut if the writing speed allows pulses to overlap. The cutting action is either thermally or chemically ablative, depending on the material being machined and the wavelength used (either the fundamental at 1064 nm, the second harmonic at 532 nm, the third harmonic at 355 nm or the fourth harmonic at 266 nm). The drive mechanism for the Nd:YAG laser was a digitally controlled servo actuator that provides a resolution of approximately 2 $\mu$m. The width of the through cut, however, depends on the diameter of the focused beam.

Laminae also have been machined with $CO_2$ laser systems. Commercial laser machining services are available for cutting metal sheet for use in a variety of applications, especially in the testing and development of electrical machinery (motors and generators). Most of the commercial $CO_2$ lasers semi-ablate or liquefy the material being cut. A high-velocity gas jet often is used to help remove debris. As with the Nd:YAG systems, the laser (or workpiece) is translated in the X-Y directions to obtain a desired pattern in the material.

An Nd:YAG pulse laser has been used to cut through, for example, 90-$\mu$m-thick steel shims. The line widths for these cuts were approximately 35 $\mu$m wide, although with steel, some tapering was observed. For the 90-$\mu$m-thick sample, three passes were made using 1 kHz pulse rate, an average laser power of 740 mW, and a distance between pulses of 2 $\mu$m. Also, the cuts were made at 355 nm. Some debris and ridging was observed along the edge of the cut on the front side. This material was easily removed from the surface during lamina preparation, such as by surface polishing.

Patterns also have been formed in laminae using a $CO_2$ laser. For example, a serpentine flexural spring used in a miniature Stirling cooler has been prepared using a $CO_2$ laser. The $CO_2$ through-cuts were approximately 200 $\mu$m wide and also exhibited a slight taper. The width of the $CO_2$ laser cut was the minimum achievable with the system used. The part was cleaned in a lamina preparation step using surface polishing to remove debris.

Pulsed Nd:YAG lasers also are capable of micromachining laminae made from polymeric materials, such as laminae made from polyimides. Pulsed Nd:YAG lasers are capable of micromachining these materials with high resolution and no debris formation. Ultraviolet wavelengths appear best for this type of work where chemical ablation apparently is the mechanism involved in removing material. Clean, sharp-edged holes in the 25–50 $\mu$m diameter range have been produced.

Which system to use for laser machining, a Nd:YAG laser, a $CO_2$ laser, or other laser, depends on several factors. For example, $CO_2$ laser systems generate more power and can cut through thicker material (upwards of several millimeters) than the Nd:YAG lasers. However, Nd:YAG systems provide smaller spot sizes, which is better suited for micromachining thin lamina. When cutting metals, both systems benefit from post cleanup of the laminae using either a chemical wash or physical polishing to remove debris. For microlamination, best results are achieved if no ridging or crust remains on the lamina. Laser micromachining, in the thermally ablative mode, produces some of these non-desirable features on the cut surface. Thus, post clean up as part of lamina preparation is preferred. However, with a chemically ablative mechanism, such as that obtained when cutting polyimide or even some metal with UV radiation, little post cleaning is needed.

2. Lamina Preparation

In another aspect of the invention, lamina forming includes lamina preparation. The laminae can be prepared by a variety of techniques. For example, surface polishing of a lamina following pattern formation may be beneficial. Moreover, acid etching can be used to remove any oxides from a lamina. In one embodiment of the invention, lamina preparation includes applying an oxide-free coating to some or all of the laminae. An example of this would be electroplating gold onto the lamina to prevent oxidation at ambient conditions.

In another embodiment of the invention, lamina preparation includes filling the spaces between the structures and substructures with a material, referred to herein for convenience as a fixative, that holds the structure and substructure together before bonding the laminae and after the fixture bridges are eliminated. For instance, investment casting wax can be used as the fixative to hold together the structure and substructure. The fixture bridges are then eliminated, and the substructure is maintained in contact with the structure by the fixative. The fixative is eliminated during or after bonding the laminae together, thus. dissociating the substructure from the structure.

B. Laminae Registration

Figure 15:
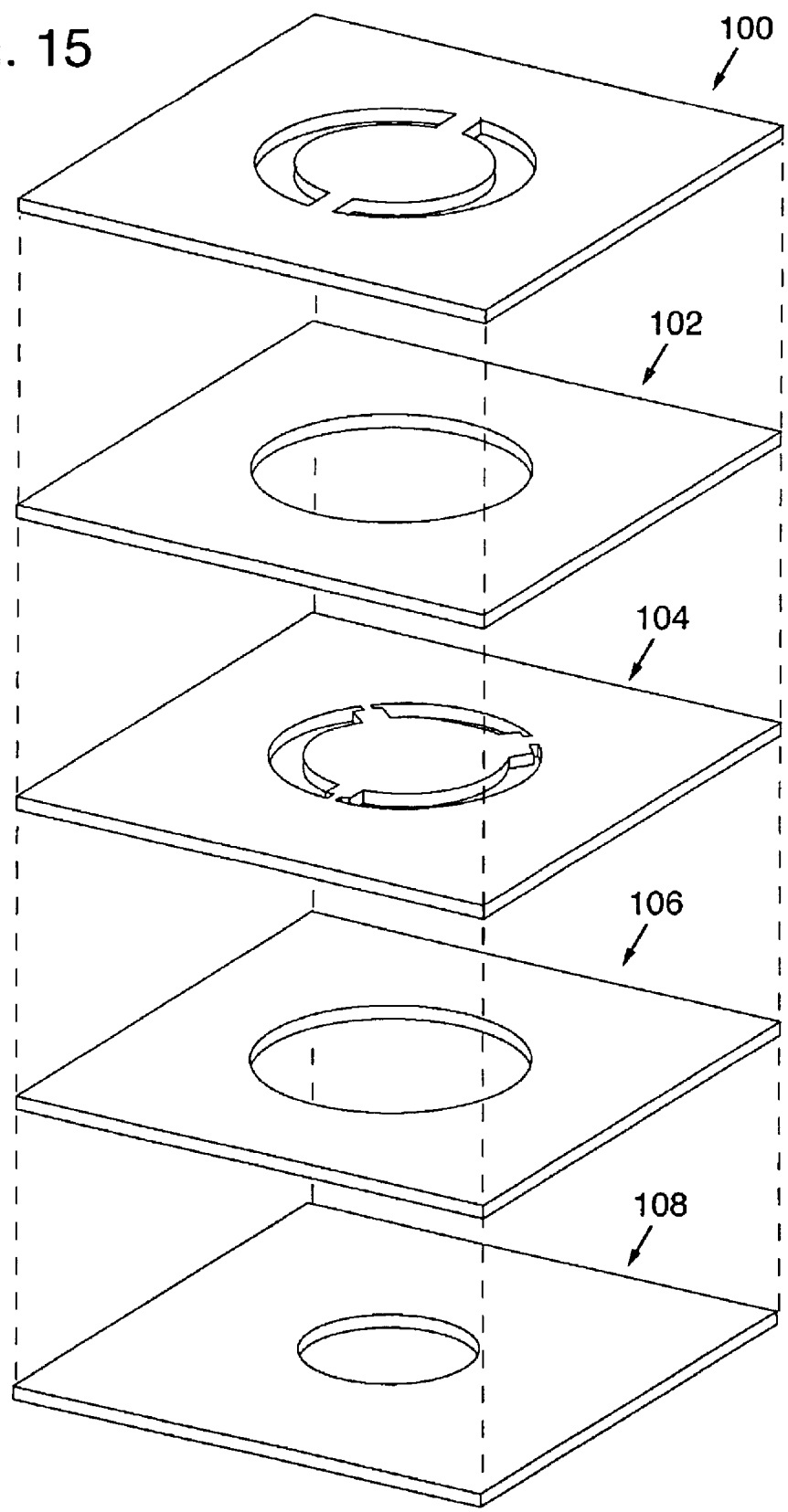
FIG. 15 illustrates the laminae of FIG. 13 in registration.
Figure 20:
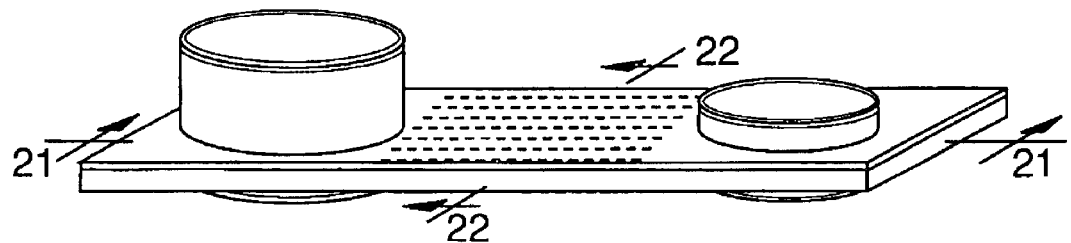
FIG. 20 is an isometric, schematic view of a miniature planer Stirling cooler with two corrugated diaphragms as the flexible volume changing elements.
Figure 22:
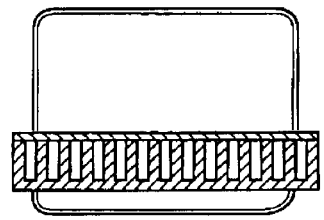
FIG. 22 is an enlarged, partial sectional view taken along line 22—22 of FIG. 20.
Figure 21:
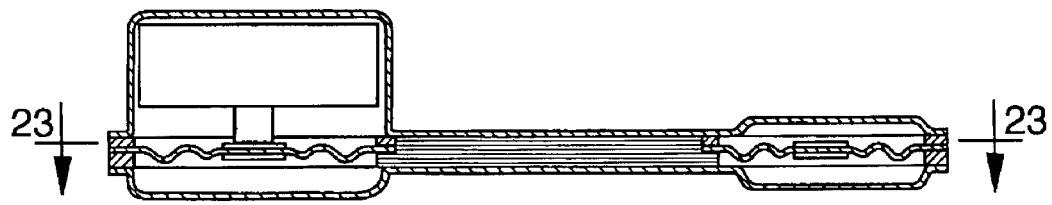
FIG. 21 is a vertical, sectional view taken along line 21—21 of FIG. 20.
Figure 23:
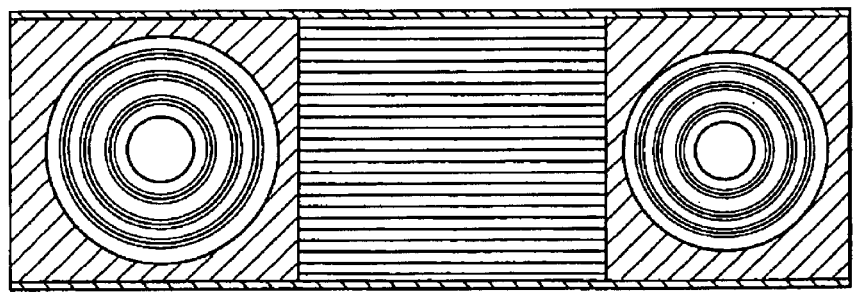
FIG. 23 is a sectional view taken along line 23—23 in FIG. 21.

Laminae registration comprises (1) stacking the laminae so that each of the plural lamina in a stack used to make a device is in its proper location within the stack, and (2) placing adjacent laminae with respect to each other so that they are properly aligned as determined by the design of the device (see, for example, FIG. 15). It should be recognized that a variety of methods can be used to properly align laminae, including manually and visually aligning laminae.

The precision to which laminae can be positioned with respect to one another may determine whether a final device will function. The complexity may range from structures such as microchannel arrays, which are tolerant to a certain degree of misalignment, to more sophisticated devices requiring highly precise alignment. For example, a small scale device may need a rotating sub-component requiring miniature journal bearings axially positioned to within a few microns of each other. Several alignment methods can be used to achieve the desired precision. Registration can be accomplished, for example, using an alignment jig that accepts the stack of laminae and aligns each using some embedded feature, e.g., comers and edges, which work best if such features are common to all laminae. Another approach incorporates alignment features, such as holes, into each lamina at the same time other features are being machined. Alignment jigs are then used that incorporate pins that pass through the alignment holes. The edge alignment approach can register laminae to within 10 microns, assuming the laminae edges are accurate to this precision. With alignment pins and a highly accurate lamina machining technique, micron-level positioning is feasible.

Registration of laminae in a working embodiments typically was accomplished using an alignment jig. If an alignment jig is used, it must tolerate the bonding step. Thus, in typical microlamination setups, the alignment jig preferably was incorporated into the design of the structure that compressed the stack for bonding. A person of ordinary skill in the art also will recognize that the registration process can be automated.

C. Laminae Bonding

Laminae bonding comprises bonding the plural laminae one to another to form a monolithic device (also referred to as a laminate). Laminae bonding can be accomplished by a number of methods including, without limitation, diffusion soldering/bonding, thermal brazing, adhesive bonding, thermal adhesive bonding, curative adhesive bonding, electrostatic bonding, resistance welding, microprojection welding, and combinations thereof.

1. Microprojection Welding

Laminae can be bonded to one another at specific sites on the laminae by the novel process of microprojection welding. Microprojection welding comprises forming lamina having at least one projection, and more typically plural projections, that extends from at least one surface, generally a major planar surface, of the lamina (See, for example, FIG. 17 and projections 302). Selective bonding is accomplished by placing laminae between electrodes and passing a current through the electrodes. The laminae are bonded together selectively at the site or sites of the projection(s). A person of ordinary skill in the art will recognize that a variety of materials suitable for welding can be used to form the projections, including mild steel, carbon steel, low carbon steel, weldable stainless steel, gold, copper, and mixtures thereof. The welding material (i.e., projections) preferably is made of the same material as the laminae being bonded.

Microprojections suitable for microprojection welding can be formed by both additive and subtractive processes. In one embodiment of the invention, a subtractive process was used to form laminae. The subtractive process comprises etching away material from a lamina to form the microprojections. A person of ordinary skill in the art will recognize that a variety of etching processes can be used, including photochemical and electrochemical etching.

In another embodiment of the invention, microprojections can be formed on laminae by an additive process. This additive process comprises building up a lamina to form the microprojections or building up the projections on a lamina prior to lamina forming. One method of forming the microprojections would involve either etching or depositing projections through a lithographic mask prior to lamina forming. Lamina forming should then be conducted with reference to the placement of these projections. For example, if the flapper valve pivot is too close to ring projections, then "flash material" may interfere with the operation-of the flapper valve. "Flash material" is extraneous projection weld material or material produced by the welding operation.

Microprojections can have several geometries. For example, individual isolated protrusions can be used. Moreover, continuous lines, rings or any other geometries suitable for the welding requirements of a particular device, can be used to practice microprojection welding of laminae.

In one aspect of the invention, plate electrodes were used to deliver current sufficient to weld the laminae to one another. The laminae that are to be welded together are placed between and in contact with the plate electrodes (FIG. 17). Optionally, pressure can be applied to place the laminae in contact with each other or the plate electrodes.

Typical projections of working embodiment had heights of from about 100 $\mu$m to about 200 $\mu$m, with diameters of about 125 μm or less. If the projections are shorter than 100 μm, electrical shorts may result. The weld nuggets produced by the welding operation had diameters of about 1.5–1.7 mm. It can be important to orient substructures on individual lamina so that weld nuggets formed by the welding process do not overlap, and hence potentially interfere with the operation of, the substructures.

2. Diffusion Soldering

Diffusion soldering is a known method for filing joints. See, for example, D. M. Jacobson and G. Humpston, Diffusion Soldering, *Soldering & Surface Mount Technology*, No. 10, pp. 27–32 (1992), which is incorporated herein by reference. However, diffusion soldering has not been adapted for use in microlamination processes for bonding laminae one to another for MECS devices.

Diffusion soldering of laminae can be practiced using a number of material combinations, including both base metals and alloys and on surfaces that have been metalized. Two of the more versatile combinations are tin-silver and tin-indium. These two diffusion-soldering systems provide a low-temperature bonding process that results in intermetallic strong joints at the material interface.

Another attractive feature is that the bond formed by diffusion soldering can take considerably higher reheat temperatures than most conventional bonding methods. Because of these characteristics, diffusion soldering is well suited for producing microlaminated devices that must operate at moderate temperatures (i.e., up to approximately 500° C.).

The tin-silver system can work on any surface able to withstand moderate temperatures and capable of receiving a plating layer of the requisite metal. For many devices, steel and stainless steel offer a number of attractive characteristics for fatigue strength, magnetic properties, relatively low thermal conductivity (for stainless steel), and corrosion resistance.

The diffusion soldering method first comprises preparing and plating the surface of each lamina. A typical plating process comprises plating with a low temperature material and a high temperature material. These two materials typically form an intermetallic material by diffusion soldering.

More specifically, diffusion soldering may involve placing a first strike layer, such as a thin strike layer of nickel (approximately 0.5 μm) on a bare surface that will receive the nickel, such as a metal or alloy surface. This layer promotes adhesion of the other platable metals. Strike layers may not be necessary. Then, a second, generally thicker layer, such as a silver layer 1 μm–10 μm, more typically 2–5 μm thick, is plated over the first layer. Copper may be preferred as a bonding agent between the strike layer or the lamina and the high temperature soldering material because of its ability to readily bond to both nickel and silver. Copper can create a copper-silver intermetallic that is weaker than the surrounding material, and hence be the site of material failure in the device. Finally, a third low-temperature material layer, typically tin, is plated 1 μm–10 μm, preferably 2–5 μm thick over the second layer.

Working embodiments used a laminate stack having alternating surfaces plated with either high-temperature or high-temperature and low-temperature material, such as silver or silver and tin. The two outside laminae typically have high-temperature material, such as silver, so that the final, bonded stack did not adhere to the alignment jig. If possible, non-bonded internal structures and cavities preferably have the silver layer on their surface. This is to prevent low-temperature material from flowing into features.

The bonding takes place by momentarily raising the stack temperature above the melting point of the low-temperature material (e.g., tin@ 232° C.) under a compression pressure sufficient to achieve the bond. At higher pressures, lower temperatures likely will be required to achieve adequate bonding. Working embodiments have used compression pressures of approximately 2 MPa to about 5 MPa. A compression pressure below about 2 MPa may not provide sufficient pressure to achieve adequate bonding. Air and other oxidizing atmospheres preferably are excluded at this point to avoid the creation of tin oxides and voids. However, with the surface properly prepared, the bonding process is rapid and complete. One important aspect is to maintain sufficiently low temperatures and pressures so that the lower temperature material does not flow into the features, causing restriction of flow therethrough or therein.

Bond strength and re-heat temperatures can benefit by heating the stack for a longer period of time at the bonding temperature, such as at least up to one hour. This allows tin to further diffuse into the silver and form stronger intermetallic compounds within the joint itself. Some evidence exists for ultimately forming a silver bond interspersed with intermetallic tin/silver particles yielding a high strength, moderate temperature joint. Indium can be used in place of tin to yield an even lower temperature (melting point of indium is 157° C.) bonding process.

3. Miscellaneous Bonding Methods

Polyimide sheet adhesives can be used to bond laminae together. Polyimide is a commercially available, high-strength, high-temperature polymer. For example, Dupont manufactures a polyimide sheet adhesive, Kapton KJ. Kapton KJ retains adhesive properties and can bond surfaces together when heated and compressed. Polyimide sheets form moderate strength bonds that also provide good sealing capability.

D. Component Dissociation by Eliminating Fixture Bridges

Component dissociation is accomplished by eliminating fixture bridges. It will be recognized that there are a variety of ways to eliminate fixture bridges, including vaporizing the fixture bridge by heating it to a sufficient temperature, chemically eliminating, such as by dissolving, the fixture bridge, and laser ablation of the fixture bridge. Combinations of these methods also can be used.

One method for vaporizing the fixture bridges comprises capacitive discharge dissociation. Capacitive discharge dissociation comprises applying a current through the fixture bridge sufficient to vaporize the fixture bridge. There are a variety of ways to apply current through a fixture bridge. Working embodiments of the method have placed a first electrode in contact with the structure and a second electrode in contact with the substructure to be dissociated. Current is passed between the electrodes.

In one embodiment of the invention, a DC power source was used to charge a capacitor. The capacitor was discharged to pass current through the electrodes. The temperature, the amount of current, and the power necessary to eliminate the fixture bridge often varies with the particular properties of the fixture bridge, including the material the fixture bridge is made of, its cross-sectional area, and its length.

In another embodiment of the invention, fixture bridges are eliminated by thermochemical dissociation. Thermochemical dissociation has the potential advantage of reducing debris that may form during fixture bridge elimination. Thermochemical dissociation comprises selectively heating the fixture bridges, in combination with chemical elimination. Selective heating of the bridge can be accomplished by applying current to the fixture bridge, heating with a laser and/or focusing a laser on the bridge. One way to apply current through the fixture bridge comprises placing electrodes at or near the ends of the fixture bridge and passing a current between the electrodes. In another embodiment of the invention, heating elements, or some other method for delivering thermal energy, can be used to selectively heat the fixture bridges.

Chemical elimination also comprises applying a sufficient amount of a chemical to eliminate the fixture bridges. The fixture bridges also optionally can be selectively heated to a temperature sufficient to help chemically eliminate them either prior to, subsequent to, or simultaneously with application of the chemical. There are a variety of chemicals that can be used to eliminate the fixture bridges, such as acids, particularly mineral acids, bases, oxidizing agents, and mixtures thereof. The concentration, pH, and temperature sufficient to selectively chemically eliminate the fixture bridges varies with the particular properties of the fixture bridge, including the material the fixture bridge is made of, the cross-sectional area, and the length. Preferably, an acid having a pH of less than about 3 and at a temperature above freezing temperature is applied to the lamina. Preferably, the fixture bridges are heated to temperatures from about 200° C. to about 300° C. If the laminae are made of a copper alloy, cupric chloride or ferric chloride can be used to chemically eliminate the bridge. If the laminae are made of steel, a mixture, such as a 1:1 volume mixture of $HCl:HNO_3$, can be used to eliminate the fixture bridge.

In another embodiment of the invention, fixture bridges are eliminated by laser ablation. In this embodiment, line-of-sight access to the fixture bridges from the exterior of the device is desired. The laser beam should be able to be focused onto the fixture bridge, which may require line-of sight access. UV lasers are particularly useful as they ablate metals as well as polymers and ceramics with little heat affect and very sharply distinguished features. Laser ablation allows the fabrication of preassembled features in materials other than metals, such as polymer and ceramics. An Nd:YAG laser operating in the fourth harmonic (266 nm wavelength) would be an example of a UV laser with sufficient power to perform this operation.

Fixture bridges can be eliminated either prior to, subsequent to, or simultaneously with bonding of the plural laminae. In one embodiment of the invention, the fixture bridges are eliminated prior to the bonding of the plural laminae one to another. Referring to FIG. 1, one method of accomplishing this is by providing a lamina 10 having a structure 12 connected to a substructure 14 by a fixture bridge 16 across a space 18 defined by the structure 12 and the substructure 14. Space 18 between the structure 12 and the substructure 14 is filled with fixative before eliminating the fixture bridge 10. A person of ordinary skill in the art will recognize that a variety of fixatives can be used. One such fixative is a wax. In one embodiment of the invention, the fixative is eliminated during or after the plural laminae are being bonded one to another.

II. Fixture Bridges

Figure 2:
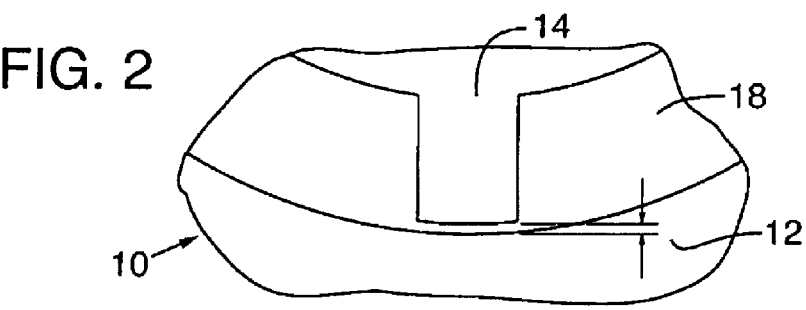
FIG. 2 is a schematic plan view of the structure and the substructure illustrated in FIG. 1 after the fixture bridge is eliminated.

Component dissociation is a microassembly technique that allows devices to be fabricated in a pre-assembled state. Plural laminae are fabricated having the structures and substructures necessary to form a working device. See, for example, the plural laminae illustrated in FIGS. 13 and 14 and the structures and substructures defined by laminae 104 and 134 respectively. With reference to the embodiment illustrated in FIG. 1, lamina 10 includes at least one structure 12 connected to at least one substructure 14 by a fixture bridge 16 across a space 18 defined by the structure 12 and the substructure 14. The device is assembled by eliminating the fixture bridge 16 as illustrated by FIG. 2.

Figure 3:
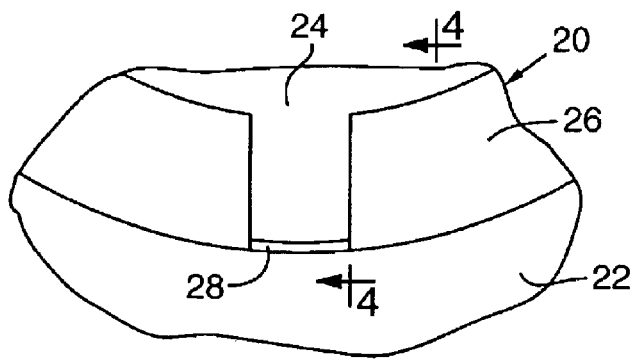
FIG. 3 is a schematic plan view of a structure and a substructure connected by another embodiment of a fixture bridge.
Figure 4:
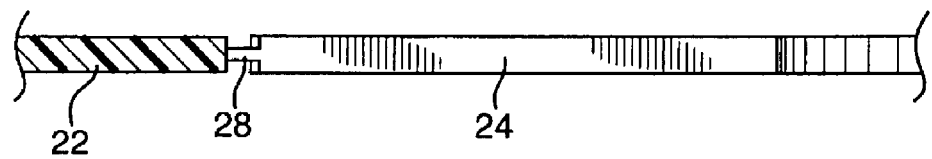
FIG. 4 is a cross-sectional view taken along line 4—4 in FIG. 3 and rotated 90 degrees.
Figure 5:
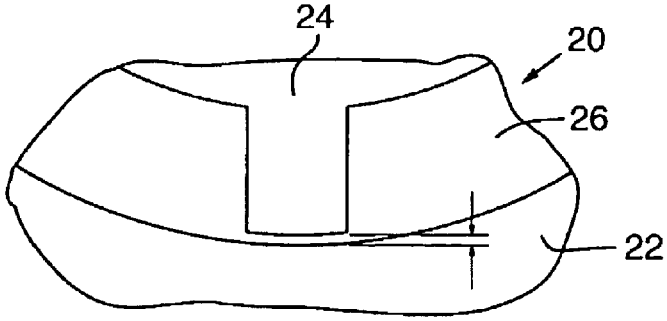
FIG. 5 is a schematic plan view of the structure and the substructure illustrated in FIG. 3 after the fixture bridge is eliminated.

FIG. 3 shows a lamina 20 having a structure 22 and a substructure 24 connected across space 26 between the structure 22 and the substructure 24 by another embodiment of a fixture bridge 28. FIG. 4 shows a detailed side-view of the structure 22 and the substructure 24 connected by the fixture bridge 28 viewed along line 4—4 in FIG. 3 and rotated 90 degrees. FIG. 5 shows the structure 22 and the substructure 24 after the fixture bridge 28 is eliminated.

In another embodiment of the invention, fixture bridges can connect substructures to one another as well as connect structures to substructures. As shown in FIG. 6, a lamina 30 can have a bridge 32 that connects two adjacent substructures 34 and 36. As shown in FIG. 7, lamina 40 can include a fixture bridge 42 that connects two non-adjacent substructures 44 and 46. It will be appreciated that other fixture-bridge designs can be used to make devices having particular structures. For example, fixture bridges can be used within a substructure (See FIG. 10, lamina 326), multiple fixture bridges can connect a structure to a substructure, multiple fixture bridges can connect substructures to one another, and multiple substructures can be connected to a structure by multiple fixture bridges. If two adjacent laminae in a stack have fixture bridges, then it is preferable to have these bridges misaligned in the stack, i.e., they preferably should be out of phase, to avoid problems associated with the welding of the laminae and elimination of the fixture bridges.

III. Devices

The method of this invention can be used to fabricate freeform geometries and microfeatures within a device. Microfeatures are of the size of from about 1 μm to about 100 μm. The methods of the invention can be used to produce micro-scale and meso-scale devices. Micro-scale devices are of the size of from about 1 μm to about 1 mm, preferably from about 1 μm to about 500 μm, and even more preferably from about 1 μm to about 100 μm. Meso-scale devices are of the size of from about 1 mm to about 10 cm, preferably from about 1 mm to about 5 cm, and even more preferably from about 1 mm to about 1 cm. Arrays of preassembled, meso-scale devices can be fabricated with overall sizes of up to about 12.5 centimeters by about 12.5 centimeters.

Devices that can be produced by the method of this invention include, without limitation, micromechanical systems, microelectromechanical systems (MEMS), microtechnology-based energy and chemical systems (MECS), microthermal systems, microthermomechanical systems, cryocoolers, alpha-Stirling coolers, heat pumps, compressors, thermal compressors, refrigerators, heat engines, valves, nozzled valves, ink jet print head valves, fuel cells, fuel combustors, fuel processors, and systems comprising one or more of these devices. Other devices that can be produced by the methods of this invention include those described in U.S. Pat. Nos. 4,875,619, 5,087,930, and 5,610,645. Examples 2–3 and 6–7 provide additional details concerning one-way valves and flapper valves that can be made by this method.

IV. Mass Production

In another aspect of the invention, multiple devices can be fabricated in parallel in a pre-assembled state. In one embodiment of the invention, multiple devices are fabricated in parallel in a pre-assembled state by sheet architecture. Sheet architecture comprises forming multiple devices simultaneously by forming sheets that have arrays of assemblies. "Assemblies" are defined as the structures and substructures that collectively define particular devices. The plural laminae are formed, registered, and bonded to form multiple preassembled devices. The methods of component dissociation are used to dissociate the substructures from the structures either prior to, subsequent to, or simultaneous with bonding the plural laminae to form fully assembled devices.

In one embodiment of the invention, the array of devices can be used in parallel. In another embodiment of the invention, the individual devices are separated from one another. A person of ordinary skill in the art will recognize that there are a variety of methods that can be used to separate the devices from one another, including separating the individual devices by a cutting process, such as wafer dicing and sawing.

In another embodiment of the invention, the assemblies are connected to each other by fixture bridges. The techniques of component dissociation are used to eliminate the fixture bridges to separate the individual devices from one another. In another embodiment of the invention, the assemblies are connected to the sheet by fixture bridges. The techniques of component dissociation are used to eliminate the fixture bridges to separate the individual devices from the sheet.

V. EXAMPLES

The following examples are provided to illustrate certain features of the present invention. It should be understood that the invention is not limited to those features exemplified.

Example 1

This example illustrates the formation of a single lamina having a structure and substructure connected by a fixture bridge. A single lamina having edge lengths of 1 inch and 1 inch and having a thickness of 3–4 mils was formed from 302 stainless steel shim stock. Using an acid etch (wet etch), a circular channel was formed in a square lamina. This resulted in a disk-like substructure. Three fixture bridges 120° apart connected the structure to the substructure. This lamina is similar to lamina 104 of FIG. 13. Each fixture bridge was about 100 $\mu$m in diameter and about 200–225 $\mu$m in length.

Figure 11:
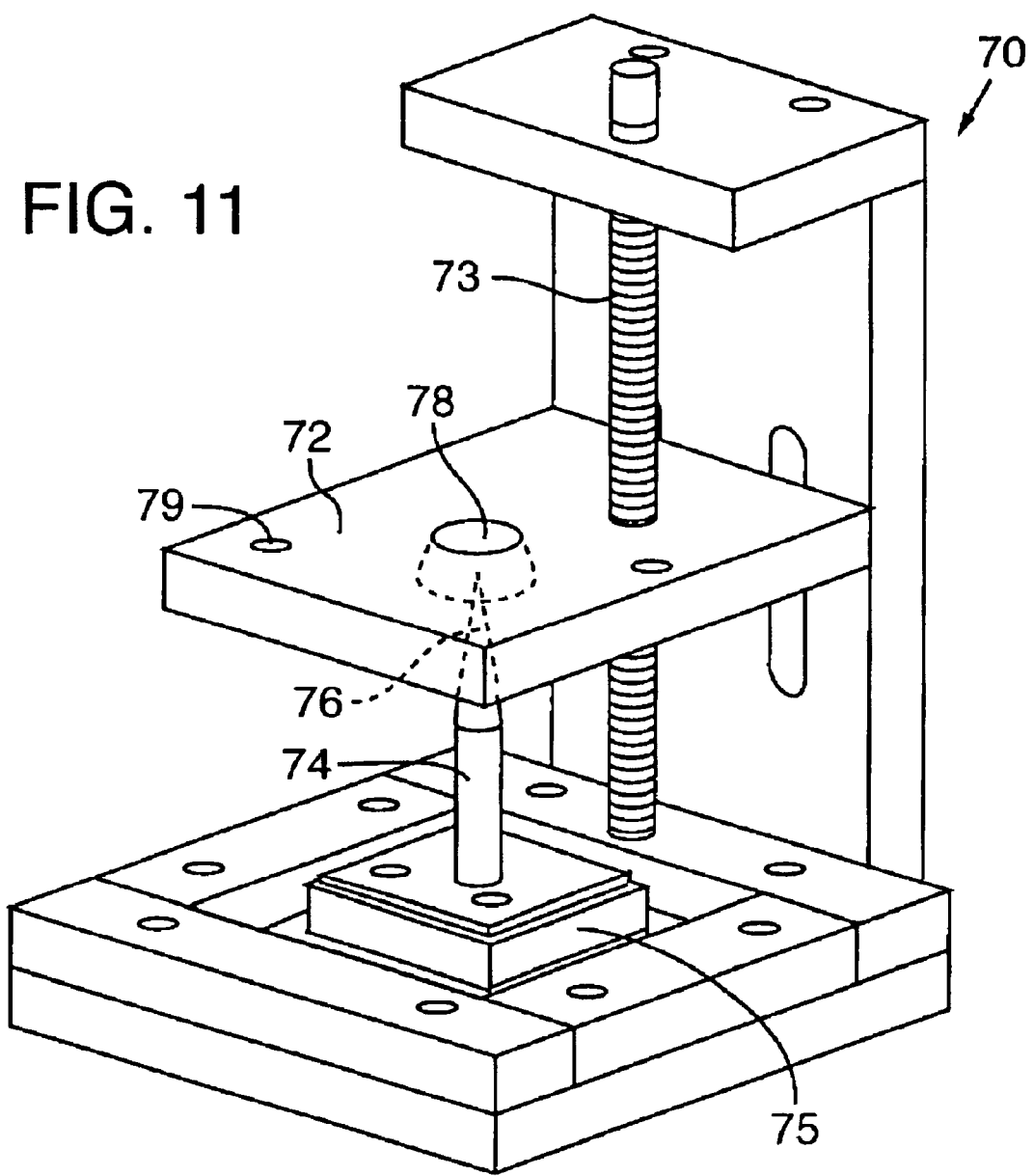
FIG. 11 is a schematic perspective view of one embodiment of a holder used to place electrodes in contact with structures and substructures to be dissociated.

Capacitive discharge dissociation was used to eliminate the three fixture bridges. The holder 70 shown in FIG. 11 was used to place the electrodes in contact with the lamina. The lamina was placed on the shelf 72 and clamped in place. The vertical position of the shelf 72 was then adjusted by rotating threaded rod 73. The position of electrode 74 with respect to the substructure to be dissociated was then further adjusted using two adjustment screws (not shown) to change position of the free-floating electrode holder 75. Electrode 74 comprising a graphite tip 76 was then placed in contact with the substructure through the shelf opening 78. The second electrode was connected to the lamina hold-down clamp affixed to shelf 72 at hole 79.

The electronic circuit 80 shown in FIG. 12 was used to pass current through the electrodes. To charge and discharge the capacitor 82 the trickle button 84 is pressed to disable the trickle resistor 86. The power supply rheostat 88 is set to the desired voltage. The charge button 90 is pressed to charge the capacitor 82. To discharge the capacitor 82, the fire button 92 is pressed. The 0.09F capacitor was charged to about 70–100V and discharged about 3–4 times to eliminate the fixture bridges. The power ($i^2R$) delivered to the fixture bridge heats the fixture bridge to a temperature sufficient to eliminate it by vaporization.

Example 2

This example describes how to make a plural-laminae one-way float valve. A one-way float valve as shown in FIG. 13 has been fabricated from stainless steel shim stock. Plural laminae 100–108 are registered and bonded to form the device. The substructure 110 is dissociated from the structure 112 by eliminating the fixture bridges 114, 116, and 118. The fixture bridges 114, 116, 118 of lamina 104 were about 50–100 $\mu$m in diameter and about 120 $\mu$m in length.

After component dissociation, the device functions as a one-way float valve as follows: when fluid enters the nozzle 122 the disk-shaped substructure 110 is lifted up by the fluid pressure, and the fluid flows out the ring nozzle 124. If fluid were to enter the ring nozzle 124, the substructure 110 would block the flow of the fluid because it is larger than the nozzle 122. The tabs on substructure 110 ensure that the disk 110 is centered on both the ring nozzle 124 and the nozzle 122.

An alternative embodiment of the one-way float valve with two tabs as shown in FIG. 14 can be similarly fabricated. Plural laminae 130–138 are registered and bonded to form the device. After bonding, the substructure 140 is dissociated from the structure 142 by eliminating the fixture bridges.

The plural laminae 100–108 were formed using laser micromachining (laser photoablation) techniques. The lamina forming included entering the design into a CAD/CAM system to generate laser tool paths. These tool paths were used to program the ESI 4420 laser micromachining system, a repetitively Q-switched, Nd:YAG laser (266 nm, 150 J, 45 nsec).

The plural laminae 100–108 were then registered and bonded using microprojection welding. A ring projection of 4 mil width and 4 mil depth was used. The bonded device is placed on a holder (FIG. 11) and the tip 76 of the electrode 74 was placed in contact with the substructure 110 through the shelf opening 78 and the nozzle 122. A second electrode was placed in contact with the device through the lamina hold-down clamp affixed to shelf 72 at hole 79. The capacitive discharge dissociation method of the previous example was used to eliminate the fixture bridges of lamina 104.

The electronic circuit shown in FIG. 12 was used to pass current through the electrodes. To charge and discharge the capacitor 82, the trickle button 84 is pressed to disable the trickle resistor 86. The power supply rheostat 88 is set to the desired voltage. The charge button 90 is pressed to charge the capacitor 82. To discharge the capacitor 82, the fire button 92 is pressed and the capacitor 82 discharges.

Lamina 138 comprises a nozzle 122 through which a fluid can flow. Lamina 134 comprises a structure 142 and a substructure 140 connected across a space 145 by fixture bridges 144 and 146. Lamina 130 comprise a ring nozzle 124 through which a fluids flow out. After the fixture bridges 144 and 146 of lamina 134 are eliminated, the substructure 140 will be a free-floating disk with tabs that can act as a one-way float valve assembly.

When fluid enters the nozzle 122 the substructure 140 is lifted up by the fluid pressure and fluid flows out the ring nozzle 124. If fluid were to enter the ring nozzle 124, then the substructure 140 would block the flow of the fluid in that direction because it is larger than the aperture of nozzle 122. The tabs on the substructure 140 serve to ensure that the substructure 140 is centered on both the ring nozzle 124 and the nozzle 122.

FIG. 15 shows the plural laminae 100–108 of the one-way float valve assembly of FIG. 13 in registration.

A sheet architecture design comprising a 3×3 array of one-way float valves is being fabricated using electrochemical micromachining and thermal brazing, or diffusion bonding. Component dissociation can be performed either serially on each device or on the devices in parallel.

Example 3

This example describes microprojection welding and a flapper valve made by the method. The flapper valve shown in FIG. 16 is fabricated by forming the plural laminae 202 and 206 and using microprojection welding to make the device. The ring projection 302 was formed by a subtractive process. Lamina about 10 mils thick were etched down to about 5–6 mils using a photochemical etch (1 mil=one-thousandth of an inch). Acids that can be used in the photochemical etch include hydrochloric acid and nitric acid. The ring projections 302 (FIG. 17) are the areas on the lamina that are not etched down. This process can be used to etch down the lamina to 5–6 mils. An additive process also can be used to form the ring projections 302.

The laminae 202 and 206 are placed between plate electrodes 306 and 308 such that the ring projections 302 of lamina 202 are in contact with the adjacent lamina 206. Current is then passed through the plate electrodes 306 and 308 and is conducted through the ring projections 302 causing the laminae 202 and 206 to be welded to each other at the site of the ring projections 302. Pressure is applied as needed to keep the projection welds in contact with the adjacent laminae. The plate electrodes are ¼-inch brass plates.

The flapper valve 208 opens in either direction by a hinge-like action at the base 210. The flapper valve 208 will open in response to the flow of fluid in through the opening 212 and out through the openings 216. The flapper valve 208 will open in the other direction in response to the flow of fluid in through openings 212 and out through openings 216. Lamina 202 has ring projections 302 that are used to weld the laminae together at the specific sites of the ring projections.

Example 4

The method of this invention can be used to fabricate a MECS. An example of a MECS that can be produced by the method of this invention is a cooler for cryogenic cooling of high-speed electronics, as illustrated in FIGS. 20–23. The cooler comprises a thermal compressor, a volume-expanding cap, and a heat exchanger or regenerator. The thermal compressor comprises a displacer assembly 360 (FIG. 8), an electromagnetic coil, and a heating element. The heat exchanger or regenerator 60 comprises multiple microchannels 62 (FIG. 9). The displacer assembly 360 (FIG. 8) comprises a series of linear flexural springs 330 and spacers 332 and 334 laminated together (FIG. 10).

The displacer is fixed in the center and, therefore, when a magnetic field is applied, the outside of the displacer oscillates producing a Stirling cycle cooling effect. Preferably, the cooler is about 2 cm in length, the microchannels are about 50 μm wide, and the gap between the displacer and the cylinder is about 20 μm.

FIG. 10 shows the plural laminae 320–328 that comprise the displacer assembly 360 (FIG. 8) of an alpha-Stirling cooler. Lamina 324 comprises a linear flexural spring 330, and laminae 322 and 326 comprise spacers 332 and 334, respectively. The linear flexural spring 330 and the spacers 332 and are connected to their respective structures 336, 338, and 340 by fixture bridges 342, 344, and 346.

The displacer middle 362 (FIG. 8) can be assembled by registering the plural laminae 320–328, alternating spacers 332 and 334 and linear flexural springs 330 for a total of about 25 laminae. The fixture bridges 342, 344, 346 can be eliminated to dissociate the linear flexural springs 330 and the spacers 332 and 334 from their respective structures 336, 338, and 340.

FIG. 8 shows the displacer assembly 360 of the alpha-Stirling cooler. The displacer assembly 360 comprises the displacer cap 366, the displacer middle 362, and the displacer bottom 368.

FIG. 9 shows the top of the alpha-Stirling cooler heat exchanger after assembly from the plural laminae 320, 322, 324, 326, and 328 (FIG. 10).

FIG. 19 shows the plural laminae 380, 382, and 384 that comprise the alpha-Stirling cooler heat exchanger, not considering the displacer, electromagnet, and volume-expanding cap. Lamina 380 is the base of the heat exchanger, lamina 382 is the middle of the heat exchanger with microchannels 62, and lamina 382 is the cap on top of the microchannels.

Example 5

Figure 24:
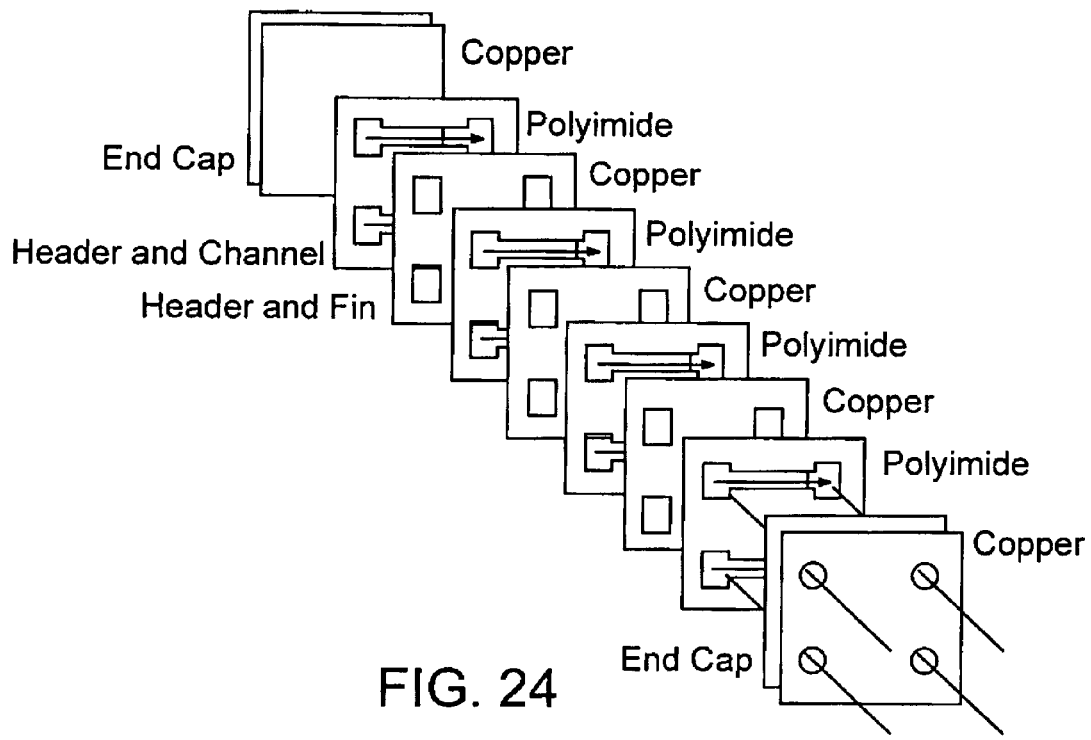
FIG. 24 is a schematic perspective view of plural laminae, and the order thereof, in a working embodiment of a dual microchannel array.

This example describes a microlamination scheme used to make a dual microchannel array, as illustrated in FIG. 24. The illustrated device is useful as a heat exchanger that rejects thermal energy to the environment. FIG. 24 illustrates the lamination scheme for prototyping the structure. The lamina are formed by micromachining copper and polyimide shims. Each lamina surface was prepared by cleaning and, depending on the bonding method, plating of a thin (1.0 to 10 μm) metal layer on both sides of the lamina. Next, the laminae were stacked and registered using an alignment jig. In a working embodiment, the laminae were thermally bonded at an elevated temperature while being pressed together. This entire process produced a single block of material having embedded high-aspect-ratio features.

Once the laminae were cut, the laminae were then stacked and registered. The stacking order was part of the design process that yielded internal structures for device operation. Once stacked in the proper order, each lamina was registered relative to the other laminae.

The device illustrated in FIG. 24 was designed to use a polymeric spacing and bonding sheet between copper micromachined shims. The bonding sheet used was a polyimide material from DuPont (Kapton type KJ) that becomes active as an adhesive at temperatures exceeding 250° C. After bonding, the device had a useful service temperature under light internal pressure up to approximately 200° C.

The laminae bonding process occurred in an alignment jig using the sides and corners of the shim material as alignment features. Specific bonding conditions for the part shown in FIG. 24 were 265° C. and a compression pressure of 200 kPa. The stack was held at the bonding temperature and pressure for approximately 1 minute, then cooled. Good, hermetic seals have been formed in working embodiments using this method. Although clean and polished metal surfaces can be bonded together, type KJ polyimide bonds best to oxidized surfaces. And under typical bonding temperatures and pressures, little flow was observed in the channel area. Bonds can be formed in an air environment, but the bonding process also can be done in a vacuum press.

The copper and polyimide laminae were cut from 100 μm-thick stock using an ESI model 4420 laser micromachining center. The output from the laser was 532 nm light from intercavity frequency doubling of the Nd:YAG fundamental. Copper lamina were cut rapidly and with little generation of surface debris. Each copper lamina was cut in approximately 45 seconds using a three pass process. The copper surface was physically polished to remove any debris and ridging that may have formed during the machining process. Polyimide lamina were cut in two passes with no observable debris formation.

The device produced after bonding was a microchannel array having 4 channels with a channel height of 100 µm, a width of 3 mm, and flow channel length of 10 mm. Headers were incorporated into the design at both ends, and as shown in FIG. 24, top and bottom caps were used to interface the flow from a test loop to the device.

Figure 25:
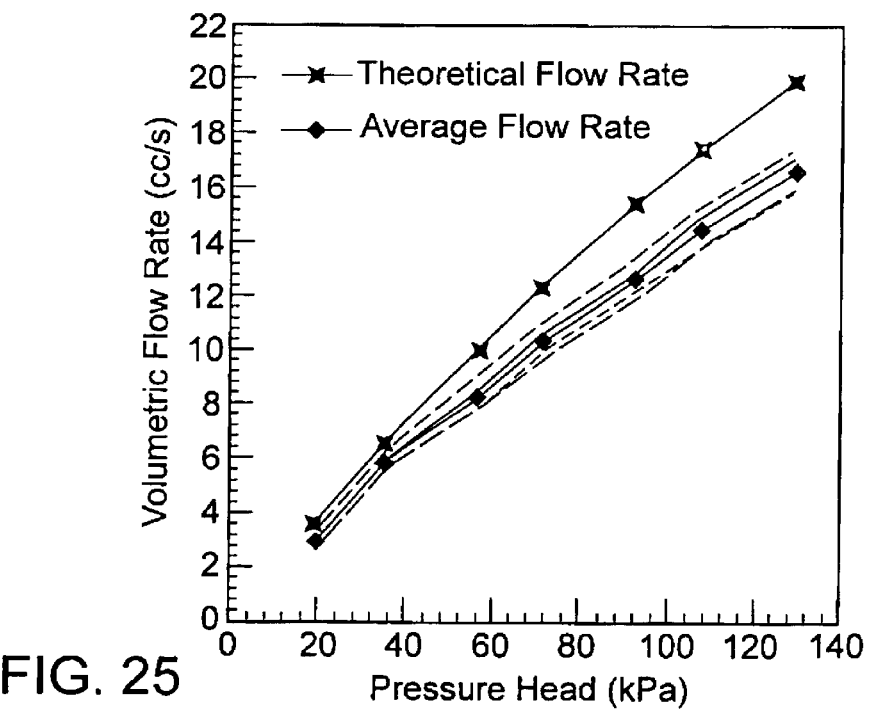
FIG. 25 is a graph illustrating volumetric flow rate versus pressure head in kPa for the device illustrated in FIG. 24.

Preliminary test data for this device is provided by FIG. 25, where volumetric flow of water was plotted versus pressure head for four nominally identical devices. The theoretical curve was for lamina flow through the channels. Since the experimental curves showed a slightly reduced flow rate, some influence from header design and other non-ideal flow characteristics probably was present. However, the data does suggest that laminar flow through the channel array provides a close approximation to the pressure drop.

Example 6

Figure 26:
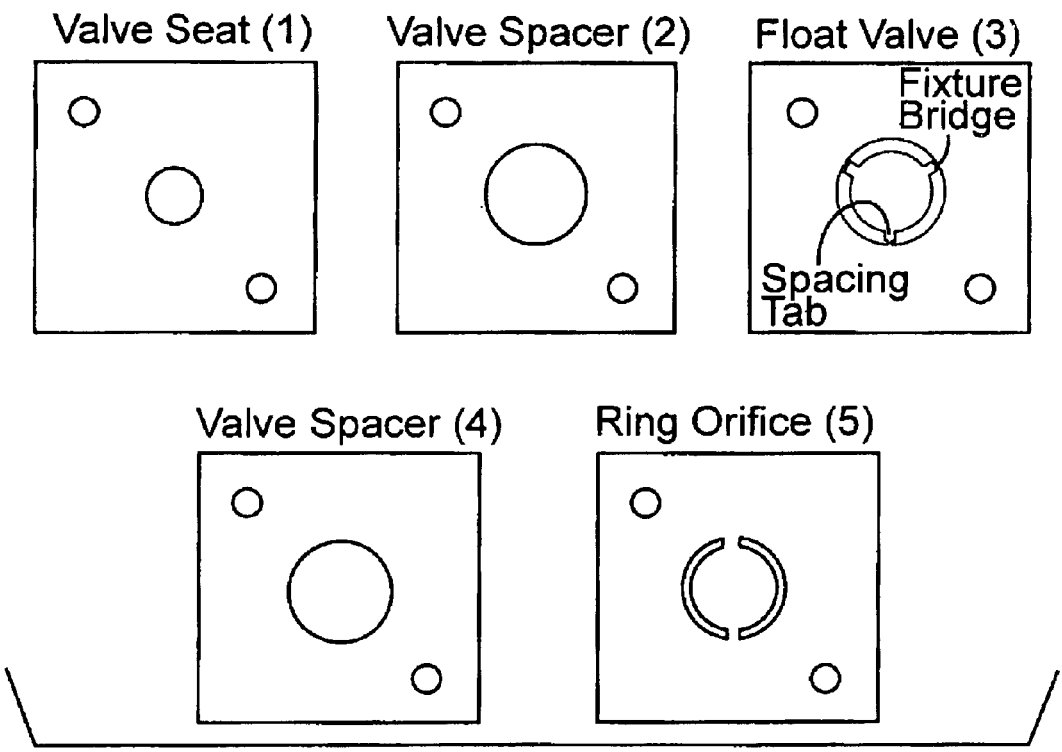
FIG. 26 is a schematic drawing of plural laminae used for making a working embodiment of a float valve.

This example describes a microlamination scheme used to make a one-way float valve as illustrated in FIG. 26 using five laminae. The design utilized an upper and lower orifice plate (laminae 1 and 5) where fluid enters and leaves the valve. The dimensions of the upper orifice was 1.5 mm in diameter with the bottom ring orifice having an outer diameter of 3 mm. In this design, the center float must be dissociated from its lamina after assembly in order for the valve to function.

The float valve design was based on a freely floating disk inside a cavity formed by two spacers, as illustrated in FIG. 26. Component dissociation was used to remove fixture bridging holding the float disk in place during assembly. The laminae were laser machined (532 nm output from a Nd:YAG pulsed laser) from 250 µm thick mild steel shim stock. Microprojection welding was used to bond the laminae. On the back side of each lamina, a microprojection was created using acid etching through a photoresist mask. The projection formed a narrow ring around each valve component having a height of approximately 100 µm. During bonding, the laminate stack was compressed while an electric discharge was sent through the assembly. This heated and collapsed the microprojections, essentially forming a weld along the length of the projections. This bonding process was accomplished in air, although it also can be done in inert gas and vacuum conditions. Polyimide adhesive and diffusion soldering also are possible valve bonding processes.

After bonding, the float plate was held in place with fixture bridging. Removal of this bridging was accomplished using a capacitive discharge process to blow the fixture bridging. Sufficient current was supplied to an electrode contacting the float plate (passing through the top center orifice) to vaporize the fixture bridging in one brief pulse. For the float valve diodicity results shown in Table 1 a 0.07 Farad capacitor bank was charged to 11 volts. With an electrode in contact with the float disk, and the body of the valve grounded, the capacitor bank was switched to connect the bank voltage to the electrode. This resulted in blowing the fixtures and freeing the float plate inside the valve cavity.

TABLE 1

| Device | Average | Maximum |
| --- | --- | --- |
| Flapper valve (with polyimide on back of valve). | 4.08 | 6.32 |
| Flapper valve (with polyimide on valve seat). | 1.22 | 1.78 |
| Flapper valve with no polyimide. | 1.71 | 2.90 |
| Float valve with no polyimide. | 11.19 | 17.10 |

Example 7

Figure 27:
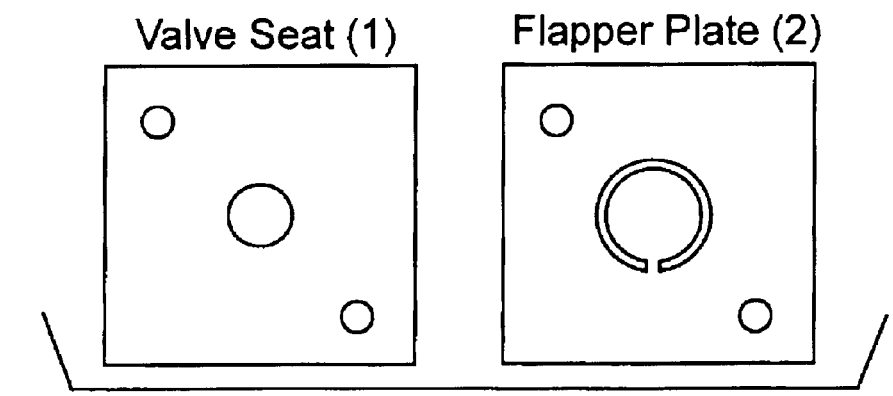
FIG. 27 is a schematic drawing of plural laminae used for making a working embodiment of a flapper valve system.

This example describes a traditional flapper assembly constructed out of two laminae. A top lamina containing the flapper was bonded to a lower orifice plate. The size of the orifice was 1.5 mm in diameter. As shown in FIG. 27, a 250 µm-thick flapper plate was bonded to a 250 µm-thick orifice plate to provide the valve action. As fluid passes into the value through the bottom orifice, the flapper lifts off the orifice and provides relatively unrestricted flow through the valve. Upon flow reversal, the flapper valve seats onto the bottom plate and creates a relatively high flow resistance. The orifice diameter used in the valve was 1.5 mm. Also, the flapper was essentially a disk having a 2.2 mm outer diameter inside a larger opening having a diameter of 3 mm. To test the effectiveness of a different valve configurations, a total of 3 valves where fabricated, two had polyimide as a seating material and one with steel-on-steel seating. Lamina material for the flapper valve was mild steel. The bonding process used for assembling the flapper valve was macro-projection welding.

Although the invention has been shown and described in the context of a preferred embodiment, it will be apparent to those of ordinary skill in the art that changes and modifications may be made thereto without departing from the invention in its broader aspects. Accordingly, the appended claims are intended to cover all such changes and modifications as follow the spirit and scope of the invention.

We claim:

1. A method for making a device or a component of a device, comprising:

providing plural laminae made from a non-thin film metal or metal alloy and stacked to define internal laminae positioned between external laminae, the plural laminae coupled together collectively defining a monolithic device or a component of a device, at least one of the internal lamina having at least one structure, at least one substructure, and at least one fixture bridge, the structure and the substructure defining a space therebetween, and further with the substructure being coupled to the structure by the fixture bridge across the space; and dissociating the substructure by applying an electrical current across the fixture bridge sufficient to eliminate the fixture bridge.

2. The method according to claim 1 where at least one lamina includes plural substructures and at least one substructure is coupled to at least one other substructure by a fixture bridge.

3. The method according to claim 1 whereby dissociating the substructure from the structure by eliminating the fixture bridge comprises:

placing a first electrode on a first substructure to be dissociated;

contacting a structure or substructure coupled to the first substructure with a second electrode; and applying a current through the first and second electrodes.

4. The method according to claim 3 where at least one of the first and second electrodes comprises a graphite tip.

5. The method according to claim 1 further, comprising:

registering the plural laminae; and bonding the plural laminae one to another to form a monolithic device prior to or subsequent to eliminating at least one fixture bridge.

6. The method according to claim 5 whereby the method of bonding the plural laminae one to another to form a monolithic device is diffusion bonding, diffusion soldering, thermal brazing, adhesive bonding, thermal adhesive bonding, curative adhesive bonding, electrostatic bonding, microprojection welding, resistance welding, or combinations of these methods.

7. The method according to claim 1 whereby making the device further comprises utilizing fabrication technologies selected from the group consisting of additive freeform fabrication, rapid prototyping, microlamination, metal microlamination, and micromechanical fabrication.

8. The method according to claim 1 whereby the manner of forming at least one lamina is selected from the group consisting of micromachining, laser photoablation, chemical micromachining, electrochemical micromachining, and through-mask electrochemical micromachining.

9. The method according to claim 1 whereby the manner of forming at least one lamina includes lamina preparation.

10. The method according to claim 9 whereby the method of lamina preparation is selected from the group consisting of chemical etching, acid etching, electropolishing, oxide-free coating, and combinations thereof.

11. The method according to claim 1 where at least one of the lamina is made from a material selected from the group consisting of metals, metal alloys, polymers, ceramics, composites, stainless steel, carbon steel or phosphor bronze, and mixtures thereof.

12. The method according to claim 1 where at least one of the lamina is made from stainless steel, carbon steel or phosphor bronze.

13. The method according to claim 1 where the device is selected from the group consisting of micromechanical systems, microelectromechanical systems, miniature energy and chemical systems, microthermal systems, microthermomechanical systems, cryocoolers, alpha-Stirling coolers, heat pumps, compressors, thermal compressors, refrigerators, heat engines, valves, nozzled valves, ink-jet print-head valves, fuel cells, fuel combustors, fuel processors, and systems comprising one or more of these devices.

14. The method according to claim 1 where the device includes at least one high-aspect-ratio microchannel having a height-to-width ratio of at least 20:1.

15. The method according to claim 1 where the device is micro-scale.

16. The method according to claim 1 where the device is meso-scale.

17. A method for making a micro- or meso-scale device or a component of such a device comprising:

providing three or more laminae made from a non-thin film metal or metal alloy that coupled together collectively define a device or a component of a device;

registering the laminae to define at least one internal lamina, positioned between a first and a second lamina, the at least one internal lamina having a structure and at least one substructure coupled to the structure or another substructure by at least one fixture bridge;

bonding the laminae one to another to form a monolithic device or a component of a device; and eliminating the fixture bridge prior or subsequent to bonding the laminae by applying an electrical current across the fixture bridge.

18. The method according to claim 17 where the structure and substructure were formed by laser micromachining photochemical micromachining, electrochemical micromachining, or combinations of these methods.

19. The method according to claim 18 where bonding comprises microprojection welding.

20. The method according to claim 18 where bonding comprises diffusion soldering.

21. The method according to claim 20 where diffusion soldering comprises using layers comprising copper, silver, tin, indium and combinations and mixtures thereof.

22. A method for making an array of devices or an array of components of devices, comprising:

providing plural laminae made from a non-thin film metal or metal alloy where at least one of the plural lamina has an array of at least two assemblies, each assembly in the array comprising at least one structure, at least one substructure, and at least one fixture bridge, such that at least one of the structures and at least one of the substructures define a space therebetween, and at least one substructure is coupled to at least one structure by at least one fixture bridge across the space;

registering the laminae to define at least one internal lamina, positioned between a first and a second lamina; and dissociating at least one substructure of an internal lamina from the structure to which it is coupled by applying an electrical current across the fixture bridge sufficient to eliminate the fixture bridge, thereby making an array of devices or an array of components of devices.

23. The method of claim 22 where at least one of the assemblies includes plural substructures and at least one substructure is coupled to at least one other substructure by at least one fixture bridge.

24. The method according to claim 22 where dissociating the substructures from structures by eliminating fixture bridges comprises:

placing an electrode on each substructure to be dissociated;

contacting the structure, coupled to the substructure with a second electrode; and applying a current through the electrodes.

25. The method according to claim 22 further comprising:

registering the plural laminae; and bonding the plural laminae one to another to form an array of monolithic devices.

26. The method according to claim 25 where the manner of bonding the plural laminae one to another to form an array of monolithic devices is selected from the group consisting of diffusion soldering, diffusion bonding, thermal brazing, adhesive bonding, thermal adhesive bonding, curative adhesive bonding, electrostatic bonding, microprojection welding, resistance welding, and combinations thereof.

27. The method according to claim 22 where dissociating a substructure from the structure to which it is coupled by eliminating the fixture bridge(s) is performed before the plural laminae are registered and bonded.

28. The method according to claim 22 where the manner of forming the plural laminae is selected from the group consisting of additive freeform fabrication, rapid prototyping, microlamination, metal microlamination, and micromechanical fabrication.

29. The method according to claim 22 where the manner of forming the array of structures and coupled substructures is selected from the group consisting of micromachining, laser photoablation, chemical micromachining, electrochemical micromachining, and through-mask electrochemical micromachining.

30. The method according to claim 22 where forming the array of structures and coupled substructures includes lamina preparation.

31. The method according to claim 30 where the manner of lamina preparation is selected from the group consisting of chemical etching, acid etching, electropolishing, oxide-free coating, and mixtures thereof.

32. The method according to claim 22 where at least one of the lamina is made from a material selected from the group consisting of metals, polymers, ceramics, composites, stainless steel, carbon steel, phosphor bronze, metal alloys, and mixtures thereof.

33. The method according to claim 22 where the device is selected from the group consisting of micromechanical systems, microelectromechanical systems, miniature energy and chemical systems, microthermal systems, microthermomechanical systems, cryocoolers, Stirling cycle cryocoolers, heat pumps, compressors, thermal compressors, refrigerators, heat engines, valves, nozzled valves, ink jet print head valves, fuel cells, fuel combustors, fuel processors, and systems comprising one or more of these devices.

34. The method according to claim 22 where the device includes at least one high-aspect-ratio microchannel with a ratio of height-to-width of at least 20:1.

35. The method according to claim 22 where the size of the device is microscale.

36. The method according to claim 22 where the size of the device is meso-scale.

37. A method for making a device or a component of a device, comprising:

providing plural laminae that coupled together collectively define a monolithic device or a component of a device, at least one of the lamina having at least one structure, at least one substructure, and at least one fixture bridge, the structure and the substructure defining a space therebetween, and further with the substructure being coupled to the structure by the fixture bridge across the space;

registering the plural laminae;

filling the space between the structure and the substructure with a fixative prior to eliminating at least one fixture bridge;

dissociating the substructure by eliminating the fixture bridge;

eliminating the fixative; and bonding the plural laminae one to another to form a monolithic device or a component of a device prior to or subsequent to eliminating at least one fixture bridge.

38. The method according to claim 37 where the fixative is a wax.

39. The method according to claim 37 where eliminating the fixative comprises heating the fixative.

40. The method according to claim 37 where the plural laminae define a subsection of a device, and further comprising registering the subsection with at least one additional lamina subsequent to eliminating the fixative.

41. The method according to claim 40 further comprising registering the subsection with plural additional lamina subsequent to eliminating the fixative.

42. A method for making an array of devices or an array of components of devices, comprising:

providing plural laminae where at least one of the plural lamina has an array of at least two assemblies, each assembly in the array comprising at least one structure, at least one substructure, and at least one fixture bridge, such that at least one of the structures and at least one of the substructures define a space therebetween, and at least one substructure is coupled to at least one structure by at least one fixture bridge across the space;

filling the space between each structure and its coupled substructure with a fixative prior to eliminating the fixture bridge;

dissociating at least one substructure from the structure to which it is coupled by eliminating the fixture bridge(s), thereby making an array of devices or an array of components of devices, where dissociating each substructure from the structure to which it is coupled by eliminating the fixture bridge(s) is performed before the plural laminae are registered and bonded; and eliminating the fixative.

43. The method according to claim 42 wherein the fixative is wax.

44. The method according to claim 42 whereby the fixative is eliminated by heating.

45. A method for making a device or a component of a device, comprising:

providing plural laminae that coupled together collectively define a monolithic device or a component of a device, at least one of the lamina having at least one structure, at least one substructure, and at least one fixture bridge made of a non-refractory material, the structure and the substructure defining a space therebetween, and further with the substructure being coupled to the structure by the fixture bridge across the space; and dissociating the substructure by eliminating the fixture bridge.

46. The method according to claim 45 where the fixture bridge consists essentially of at least one metal or metal alloy.

47. The method according to claim 45 where at least one lamina includes plural substructures and at least one substructure is coupled to at least one other substructure by a fixture bridge.

48. The method according to claim 45 whereby dissociating the substructure by eliminating at least one fixture bridge comprises applying an electrical potential across the fixture bridge sufficient to eliminate the fixture bridge.

49. The method according to claim 45 whereby dissociating the substructure from the structure by eliminating the fixture bridge comprises:

placing a first electrode on a first substructure to be dissociated;

contacting a structure or substructure coupled to the first substructure with a second electrode; and applying a current through the first and second electrodes.

50. The method according to claim 49 where at least one of the first and second electrodes comprises a graphite tip.

51. The method according to claim 45 further, comprising:

registering the plural laminae; and bonding the plural laminae one to another to form a monolithic device prior to or subsequent to eliminating at least one fixture bridge.

52. The method according to claim 51 whereby the method of bonding the plural laminae one to another to form a monolithic device is diffusion bonding, diffusion soldering, thermal brazing, adhesive bonding, thermal adhesive bonding, curative adhesive bonding, electrostatic bonding, microprojection welding, resistance welding, or combinations of these methods.

53. The method according to claim 51 further comprising:
filling the space between the structure and the substructure with a fixative prior to eliminating at least one fixture bridge; and
eliminating the fixative.

54. The method according to claim 53 where the fixative is a wax.

55. The method according to claim 53 where eliminating the fixative comprises heating the fixative.

56. The method according to claim 45 where at least one of the lamina is made from a material selected from the group consisting of metals, metal alloys, polymers, composites, stainless steel, carbon steel or phosphor bronze, and mixtures thereof.

57. The method according to claim 45 where the device is selected from the group consisting of micromechanical systems, microelectromechanical systems, miniature energy and chemical systems, microthermal systems, microthermomechanical systems, cryocoolers, alpha-Stirling coolers, heat pumps, compressors, thermal compressors, refrigerators, heat engines, valves, nozzled valves, inkjet print-head valves, fuel cells, fuel combustors, fuel processors, and systems comprising one or more of these devices.

58. The method according to claim 45 where the device or a component of a device is meso-scale.

59. A method for making a micro- or meso-scale device or a component of such a device comprising:
providing three or more laminae that coupled together collectively define a device or a component of a device;
registering the laminae to define at least one internal lamina, positioned between a first and a second lamina, the at least one internal lamina having a structure and at least one substructure coupled to the structure or another substructure by at least one fixture bridge made of a non-refractory material;
bonding the laminae one to another to form a monolithic device or a component of a device; and
eliminating the fixture bridge prior or subsequent to bonding the laminae by applying an electrical potential across the fixture bridge.

60. The method according to claim 59 further comprising:
filling the space between a structure and a substructure with a fixative prior to eliminating the fixture bridge;
dissociating at least one substructure from the structure to which it is coupled by eliminating the fixture bridge; and
eliminating the fixative.

* * * * *